United States Patent
Beyda et al.

(10) Patent No.: US 8,150,732 B2
(45) Date of Patent: *Apr. 3, 2012

(54) AUDIENCE TARGETING SYSTEM WITH SEGMENT MANAGEMENT

(75) Inventors: Gil Beyda, Dresher, PA (US); Donald J. Locker, Lebanon, PA (US); Krishna Balasubramanian, Abington, PA (US); Kevin M. McDonald, Charleston, SC (US); Albert E. Wenger, Scarsdale, NY (US); Joseph G. Wilson, Fairfax, VA (US)

(73) Assignee: Tacoda LLC, New York, NY (US)

( * ) Notice: Subject to any disclaimer, the term of this patent is extended or adjusted under 35 U.S.C. 154(b) by 2091 days.

This patent is subject to a terminal disclaimer.

(21) Appl. No.: 10/981,733

(22) Filed: Nov. 5, 2004

(65) Prior Publication Data

US 2005/0125289 A1    Jun. 9, 2005

Related U.S. Application Data

(63) Continuation-in-part of application No. 10/669,791, filed on Sep. 25, 2003.

(60) Provisional application No. 60/491,521, filed on Aug. 1, 2003.

(51) Int. Cl.
*G06Q 30/00*    (2012.01)
(52) U.S. Cl. .............. 705/14.49; 705/14.53; 705/14.73
(58) Field of Classification Search .............. 705/14.49, 705/14.53, 14.73
See application file for complete search history.

(56) References Cited

U.S. PATENT DOCUMENTS

| | | | |
|---|---|---|---|
| 5,675,510 A | 10/1997 | Coffee et al. | |
| 5,796,952 A | 8/1998 | Davis et al. | |
| 5,948,061 A | 9/1999 | Merriman et al. | |
| 6,078,866 A | 6/2000 | Buck et al. | |
| 6,108,637 A | 8/2000 | Blumenau | |
| 6,108,645 A | 8/2000 | Eichstaedt et al. | |
| 6,115,680 A | 9/2000 | Coffee et al. | |
| 6,138,115 A | 10/2000 | Agrawal et al. | |
| 6,154,783 A | 11/2000 | Gilmour et al. | |
| 6,237,033 B1 | 5/2001 | Doeberl et al. | |
| 6,269,361 B1 | 7/2001 | Davis et al. | |
| 6,324,519 B1 | 11/2001 | Eldering | |
| 6,385,619 B1 | 5/2002 | Eichstaedt et al. | |
| 6,421,729 B1 * | 7/2002 | Paltenghe et al. | 709/229 |
| 6,477,575 B1 | 11/2002 | Koeppel et al. | |
| 6,487,390 B1 | 11/2002 | Virine et al. | |
| 6,526,406 B1 | 2/2003 | Suzuki et al. | |
| 6,560,578 B2 | 5/2003 | Eldering | |

(Continued)

FOREIGN PATENT DOCUMENTS

JP    2001175761 A    6/2001

(Continued)

*Primary Examiner* — Raquel Alvarez
(74) *Attorney, Agent, or Firm* — David R. Yohannan; Kelley Drye & Warren LLP

(57) ABSTRACT

Systems, methods and apparatus for delivering content to an audience member over a computer network. A console allows a user to define audience segments that are organized in hierarchical fashion. The segments are then calculated by collecting profile data for audience members and determining whether members have attributes that a defined by the audience segments. The hierarchical definition of segments allows audience segments to be logically combined and facilitates efficient recalculation of audience segments. Profile synchronization provides an authoritative identifier that is used to reconcile the potential issuance of multiple identifiers for a given audience member.

13 Claims, 15 Drawing Sheets

U.S. PATENT DOCUMENTS

| | | | |
|---|---|---|---|
| 6,563,514 B1 | 5/2003 | Samar | |
| 6,604,138 B1 * | 8/2003 | Virine et al. | 709/224 |
| 6,606,745 B2 | 8/2003 | Maggio | |
| 6,611,839 B1 | 8/2003 | Nwabueze | |
| 6,611,842 B1 | 8/2003 | Brown | |
| 6,643,635 B2 | 11/2003 | Nwabueze | |
| 6,643,696 B2 | 11/2003 | Davis et al. | |
| 6,665,837 B1 | 12/2003 | Dean et al. | |
| 6,698,020 B1 | 2/2004 | Zigmond et al. | |
| 6,704,727 B1 | 3/2004 | Kravets | |
| 6,708,203 B1 | 3/2004 | Makar et al. | |
| 6,714,917 B1 | 3/2004 | Eldering et al. | |
| 6,757,682 B1 | 6/2004 | Naimark et al. | |
| 6,763,334 B1 | 7/2004 | Matsumoto et al. | |
| 6,763,386 B2 | 7/2004 | Davis et al. | |
| 6,778,975 B1 | 8/2004 | Anick et al. | |
| 6,785,666 B1 | 8/2004 | Nareddy et al. | |
| 6,785,704 B1 | 8/2004 | McCanne | |
| 6,807,558 B1 | 10/2004 | Hassett et al. | |
| 6,832,207 B1 | 12/2004 | Shkedi | |
| 6,871,196 B1 | 3/2005 | Chan et al. | |
| 6,873,981 B2 | 3/2005 | Nareddy et al. | |
| 6,917,972 B1 | 7/2005 | Basko et al. | |
| 6,993,529 B1 | 1/2006 | Basko et al. | |
| 2001/0042064 A1 | 11/2001 | Davis et al. | |
| 2001/0047354 A1 | 11/2001 | Davis et al. | |
| 2001/0051940 A1 | 12/2001 | Soulanille | |
| 2002/0002445 A1 | 1/2002 | Doliov | |
| 2002/0165849 A1 | 11/2002 | Singh et al. | |
| 2002/0169760 A1 | 11/2002 | Cheung et al. | |
| 2003/0028529 A1 | 2/2003 | Cheung et al. | |
| 2003/0033292 A1 | 2/2003 | Meisel et al. | |
| 2003/0055816 A1 | 3/2003 | Paine et al. | |
| 2003/0093285 A1 | 5/2003 | Colace et al. | |
| 2003/0149937 A1 | 8/2003 | McElfresh et al. | |
| 2003/0208474 A1 | 11/2003 | Soulanille et al. | |
| 2003/0212648 A1 | 11/2003 | Cunningham et al. | |
| 2003/0220912 A1 | 11/2003 | Fain et al. | |
| 2004/0039733 A1 | 2/2004 | Soulanille | |
| 2004/0054661 A1 | 3/2004 | Cheung et al. | |
| 2004/0073538 A1 | 4/2004 | Leishman et al. | |

FOREIGN PATENT DOCUMENTS

| | | |
|---|---|---|
| JP | 2002092284 | 3/2002 |
| JP | 2006522011 | 9/2006 |
| WO | WO 01/54034 A1 | 7/2001 |
| WO | WO0190956 | 11/2001 |
| WO | WO 02/13112 A | 2/2002 |
| WO | WO02065331 | 8/2002 |
| WO | WO 02/102030 A2 | 12/2002 |

* cited by examiner

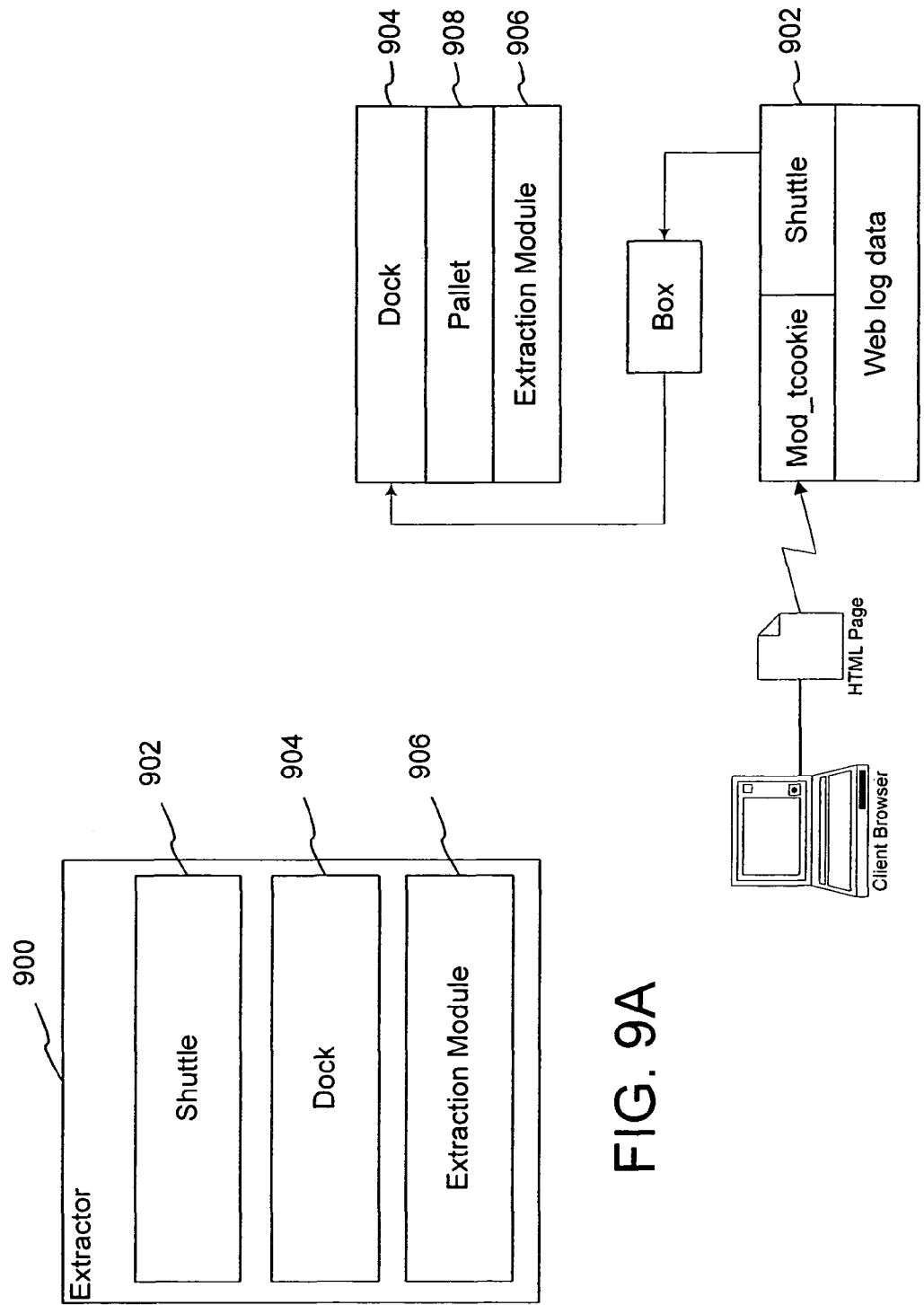

AUDIENCE TARGETING SYSTEM WITH SEGMENT MANAGEMENT

CROSS REFERENCE TO RELATED APPLICATIONS

This application is a continuation-in-part of U.S. patent application Ser. No. 10/669,791, filed on Sep. 25, 2003, and entitled "System and Method for Segmenting and Targeting Audience Members," which claims the benefit under 35 USC §119 of Provisional Patent Application No. 60/491,521, filed on Aug. 1, 2003. The entire contents of these Applications are hereby incorporated by reference.

This application is also related to U.S. patent application Ser. No. 10/981,758, filed on Nov. 5, 2004, and entitled "Audience Targeting System with Profile Synchronization".

BACKGROUND OF THE INVENTION

1. Field of the Invention

This invention relates generally to audience targeting and more particularly to segment management and profile synchronization in an audience targeting environment.

2. Description of the Related Art

Targeted marketing has long been known as an effective method for reaching consumers. When the consumer receives only relevant content (advertisements, etc.) from a provider, the consumer is more likely to patronize the particular provider, make purchases, and provide additional personal information that may assist in refining the provider's "view" of the consumer. As such, targeted marketing can lead to a more focused and robust interaction with the consumer. This, correspondingly, can lead to a more rewarding interaction for the provider by generating increased revenue.

In order to effectively target a consumer, it may be desirable for marketing systems to react to consumer information received from a variety of online and offline sources. These sources may include databases and servers, as well as multiple web properties within a network of affiliated websites. Moreover, the consumer information may be collected from a variety of sources in diverse formats. It may also be desirable for marketing systems to interact with the systems that actually deliver the content to the user. In short, an effective marketing system may appreciate the characteristics and preferences of a specific user regardless of the number or type of channels through which contact with the user is made.

Some known systems, however, are only adapted to receive information from a single source (e.g., registration information provided by the consumer). Other systems may receive information from multiple sources, but are unable to usefully combine information relating to the same consumer and communicate it to the necessary content delivery system. Thus, it may be desirable to have a system and method for delivering content that integrates with and aggregates data from various sources, including the underlying systems that deliver content to the consumer.

Known systems for delivering targeted content to consumers are focused on reaching the greatest quantity of consumers, without considering the value of interacting with each particular consumer. For example, some systems may deliver "targeted" content to each member of a group of consumers based on the fact that each subscribes to the same magazine. These systems, however, do not consider that only a portion of the group may make on-line purchases, for example, in addition to subscribing to the magazine. This failure to recognize and differentiate "valuable" consumers can lead to lost revenue for the content provider. In addition, the delivery of content to a significant volume of low-value consumers may expend valuable system resources. Accordingly, it may be desirable to have a means of delivering the appropriate content to the appropriate user in order to maximize the value of the relationship between the provider and the consumer.

Another problem with content delivery systems is that the information upon which targeting is based may rapidly become stale. An audience member deemed to have particular characteristics may no longer have such characteristics by the time content is delivered. New potential audience members may also become available after determination of a targeted group. The volatility of audience member characteristics and the high volume of information to be processed both present difficulties to systems that seek to target well tailored audiences.

Still another problem with content delivery systems, particularly those that seek to collect information and deliver content to particular audience members over the Internet, is the potential for faulty identification of audience members. For example, some systems may use cookies to attempt to uniquely identify an audience member. This presents potential problems because a given person may use several computers and thereby generate several cookies. Software and browser maintenance activities may also prompt the deletion of cookies. Furthermore, there may be computers that are commonly used by numerous uses. Each of these factors may prompt the proliferation of unnecessary and sometimes erroneous profiles.

What is needed is an audience targeting system that organizes profile data in a fashion that is more user friendly and facilitates improved calculation and recalculation of audience members to target, as well as techniques for reconciling the proliferation of unnecessary and/or erroneous profiles.

SUMMARY OF THE INVENTION

According to one aspect, the present invention provides an audience targeting system and corresponding methods and computer program products for managing audience segments. In one embodiment, a hierarchical architecture for defining and managing audience segments is provided. The hierarchical architecture facilitates efficient calculation of the membership of audience segments. Tables that identify lists of audience members belonging to particular segments may be maintained. These membership lists may be logically combined to determine the membership of dependent (e.g., child) audience segments. The membership in audience segments may also be efficiently recalculated by determining audience members who respectively enter and exit audience segments, with calculation for segments propagating through the hierarchical architecture.

According to another aspect, the present invention provides profile synchronization. In one embodiment, a profile identifier is a system based identifier that uniquely identifies an audience member. An authoritative identifier (e.g., a registration identifier) is also sought and maintained in association with a profiled audience member. An authoritative identifier may be identified in connection with some collected profile data. Maintenance of associations between authoritative identifiers and profile identifiers allows such collected profile data to be properly associated with a particular audience member despite the absence of a profile identifier in the collected data. Maintenance of associations between profile identifiers and external (e.g., cookie) identifiers also allows determination that multiple such identifiers correspond to a particular audience member.

The present invention can be embodied in various forms, including business processes, computer implemented methods, computer program products, computer systems and networks, user interfaces, application programming interfaces, and the like.

BRIEF DESCRIPTION OF THE DRAWINGS

These and other more detailed and specific features of the present invention are more fully disclosed in the following specification, reference being had to the accompanying drawings, in which:

FIGS. 9A-B are respectively a block diagram illustrating an example of a particular extractor 900 and a schematic diagram that exemplifies a model for extracting profile data according to another aspect of the present invention.

DETAILED DESCRIPTION OF THE INVENTION

In the following description, for purposes of explanation, numerous details are set forth, such as flowcharts and system configurations, in order to provide an understanding of one or more embodiments of the present invention. However, it is and will be apparent to one skilled in the art that these specific details are not required in order to practice the present invention.

Figure 1:
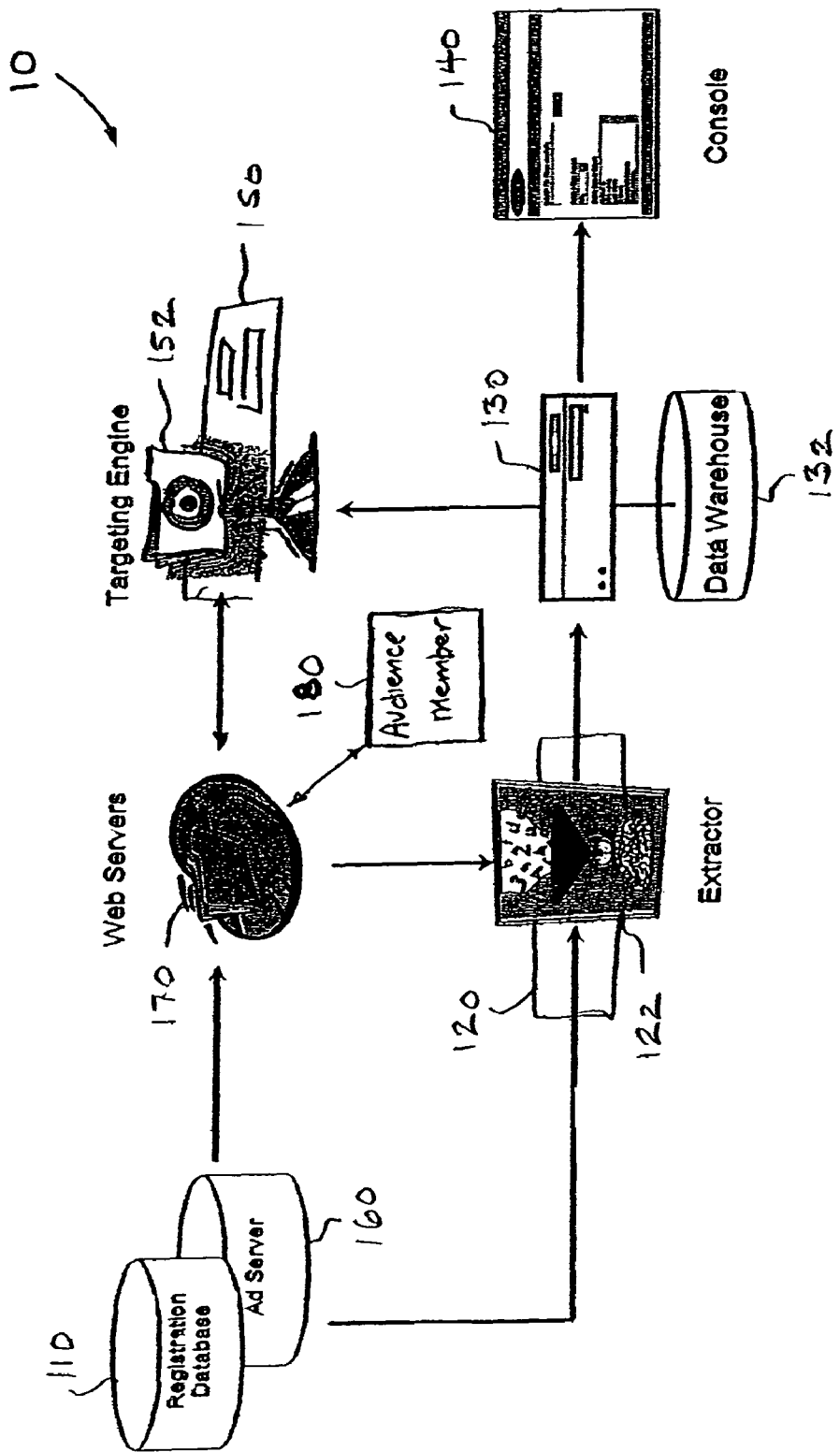
FIG. 1 is a block diagram illustrating an example of a system for delivering content to an audience member.

One embodiment of the system 10 for delivering content to an audience member is shown in FIG. 1. The system 10 includes a first server 120 which hosts an extractor program 122. The first server 120 is operatively connected to one or more offline databases 110, and one or more external content servers 160. The offline databases 110 and external content servers 160 are also operatively connected to one or more web servers 170. The web servers 170 may provide website pages to an audience member computer 180 in a conventional manner. The web servers 170 are also operatively connected to a targeting engine program 152 resident on a second server 150. The first and second servers 120 and 150 may be operatively connected to a third server 130 which contains a database 132 (referred to as the data warehouse) for storing audience member profile data. In some embodiments of the present invention, the same server may act as the first, second, and/or third servers 120, 150, and 130. A control console 140 may be operatively connected to the third server 130.

Figure 2:
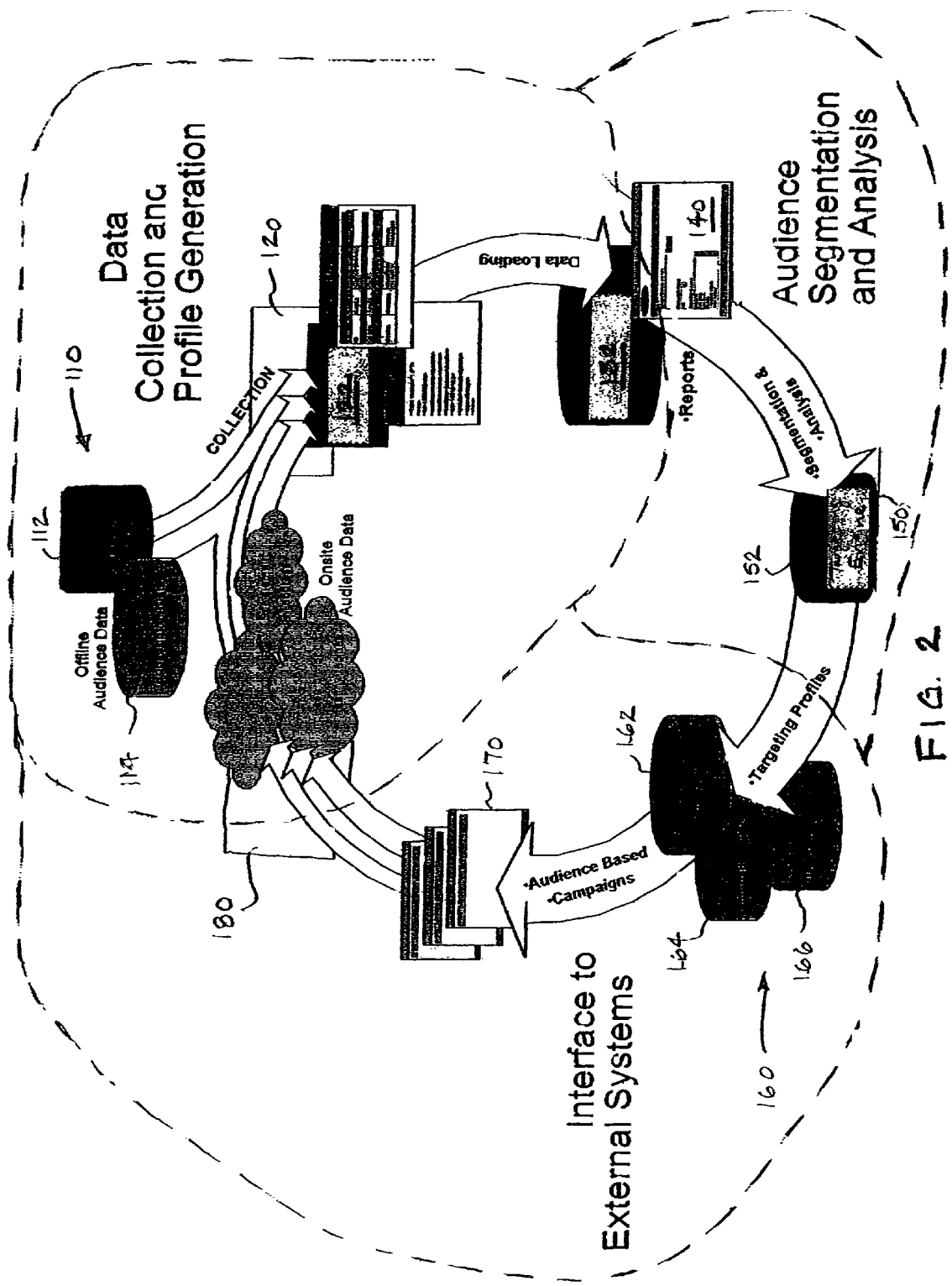
FIG. 2 is a flow diagram illustrating an example of delivering content to an audience member.

FIG. 2 is a flow diagram illustrating an example of delivering content to an audience member. This may include three primary stages: data collection and profile generation; audience segmentation and analysis; and interface to external systems. During data collection and profile generation, offline data sources 110 are searched to collect profile data relating to individuals (referred to as audience members). This profile data is stored in the data warehouse 132. During audience segmentation and analysis, the profile data for audience members is used to categorize the audience members into segments. For example, profile data may indicate that a particular audience member subscribes to Golf Magazine, and thus has some interest in golf. That audience member may then be included in a segment (i.e., group) of audience members that are also interested in golf. During the interface to external systems stage, a targeting engine 152 may use the inclusion of the audience member in a segment to direct targeted external content to the audience members in that segment. Continuing with the example posed above, audience members in the "golf" segment may have golf related content sent to them as a result.

With continued reference to FIG. 2, data collection and profile generation may involve the offline databases 110, the extractor program 122, and the data warehouse 132. Initial profile information about individual audience members may be collected from available databases, such as a registration database 112 and a subscription database 114 by the extractor 122. Registration and subscription databases 112 and 114 may include audience member profile data collected as a result of the audience member registering with, or subscribing to, any type of service, including but not limited to an Internet, magazine, newspaper, newsletter, cable, telephone, or wireless service, for example. These registration and subscription databases may include a wide variety of profile information such as name, gender, age, birth date, home and work addresses, telephone numbers, credit and charge card information, marital status, income level, number and age of children, employment history, hobbies, recent purchases, educational status, interests, preferences, and the like, for example.

The extractor 122 is a program that is used to parse and identify audience member profile data from within a set of data. The extractor 122 may be constructed using Java, Perl, C++, C#, SQL, or any other similar programming language. The extractor 122 may be resident on a server 120, or multiple servers. The extractor 122 may be governed by a set of extraction rules that determine the source(s) and format(s) of profile data that may be used to create a profile for an audience member, and the categories of profile data to be collected. The extraction rules may include a series of text rules (using matching utilities such as string matching or regular expressions) that are used to transform data in one form into a more standardized form while removing unneeded data. The extraction rules may include, for example, a statement such as "if string contains 'A' then output result 'B'."

The extractor 122 is operatively connected to a database 132 referred to as the data warehouse 132. The data warehouse 132 may be provided on a second server 130, and may be used to store the profile and segment affinity data relating to audience members. The extractor 122 may routinely update the profile and segment affinity data in the data warehouse 132. As new or modified profile data becomes available from the offline databases 110, the extractor 122 may modify the profile data for an audience member. The extractor 122 may also receive profile data directly from the audience member computer 180 and/or the targeting engine 152 that indicates the website pages visited, the web searches conducted, and the emails received by the audience member.

Figure 3:
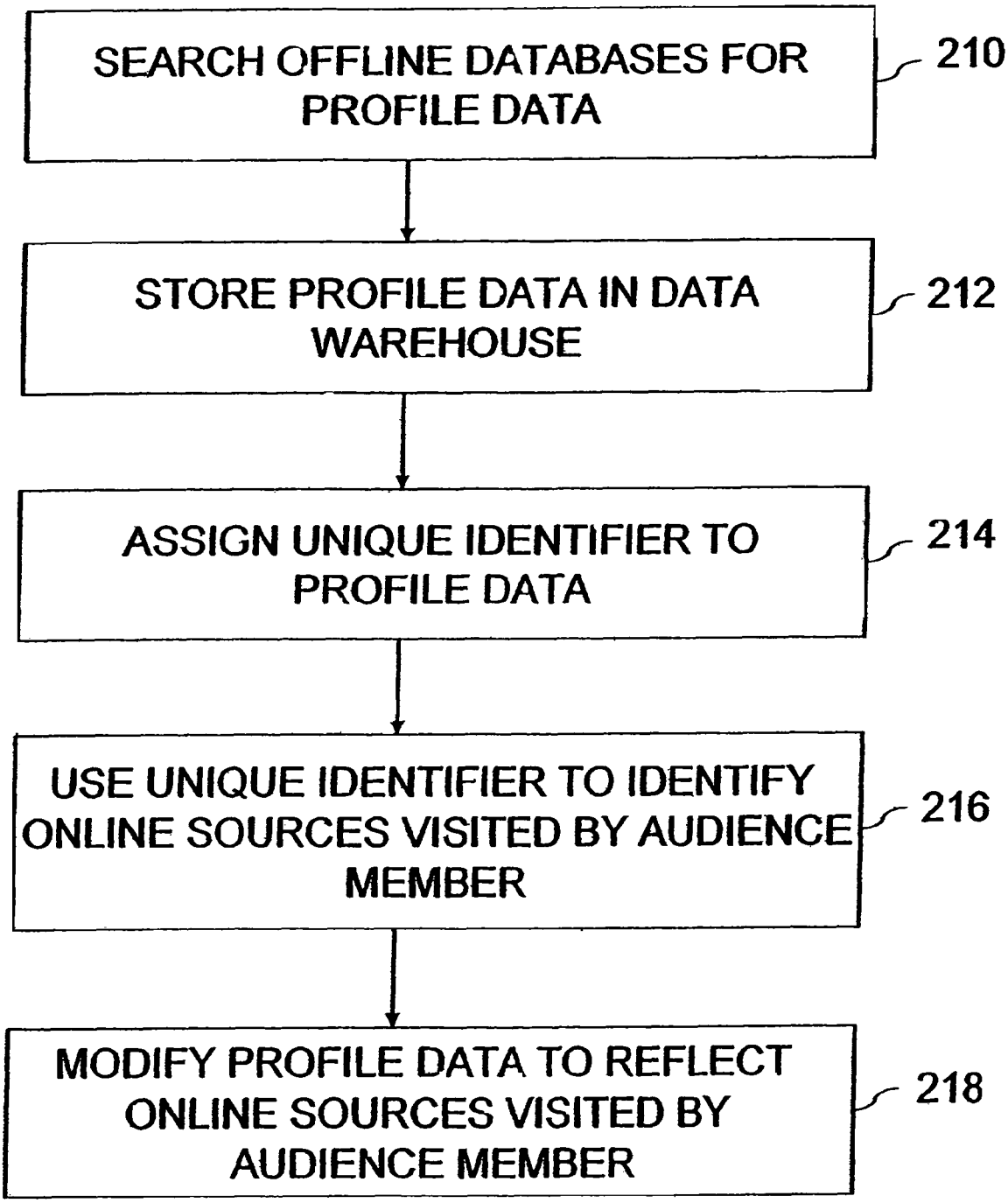
FIG. 3 is a flow diagram illustrating an example of generating audience member profiles.

FIG. 3 is a flow diagram illustrating an example of generating audience member profiles. The steps shown in FIG. 3 show the manner in which the extractor 122 obtains profile data indicating the online website pages visited by an audience member. In step 210 the extractor searches the offline databases, such as registration and subscription databases, for profile data relating to individual audience members. The search of the offline databases may be initiated by an instruction received from the console 140. For example, an instruction could be given to collect profile data for all audience members who subscribe to the New York Times. Such an instruction necessitates that the extractor 122 have access to the subscription database for the New York Times.

The extraction rules determine the profile data that is collected. In step 212, the profile data extracted from the offline sources may be stored in the data warehouse. As there may be a need to determine the profile data that is associated with a particular audience member, the extractor may assign a unique identifier to the profile data in step 214. The unique identifier may be a string of numeric, alphabetic, alphanumeric, or other characters that may be used to identify one audience member.

In step 216, the unique identifier may be used to identify content visited by the audience member. The unique identifier may be so used by including it in a domain cookie associated with each website page visited by the audience member. Each of these domain cookies may be stored on the computer associated with the audience member, and may be used to identify each particular website page visited by the audience member as being associated with the unique identifier. In step 218, the extractor may determine the domain cookies that are stored on the audience member's computer. Because these domain cookies include the unique identifier that identifies the particular audience member, the extractor may use these cookies to modify the profile data for a particular audience member to reflect that the audience member visited the website pages associated with the cookies. By combining the profile data obtained from the offline databases with the profile data updates that occur as a result of the audience member visiting website pages, a complete set of profile data may be collected for an audience member, reflecting both offline and online behavior and characteristics for the audience member.

Tracking the online history of an audience member requires that the system be able to uniquely identify audience members. This tracking may be accomplished by combining a unique identifier for each audience member with website pages in the network that the audience member has visited.

Figure 4:
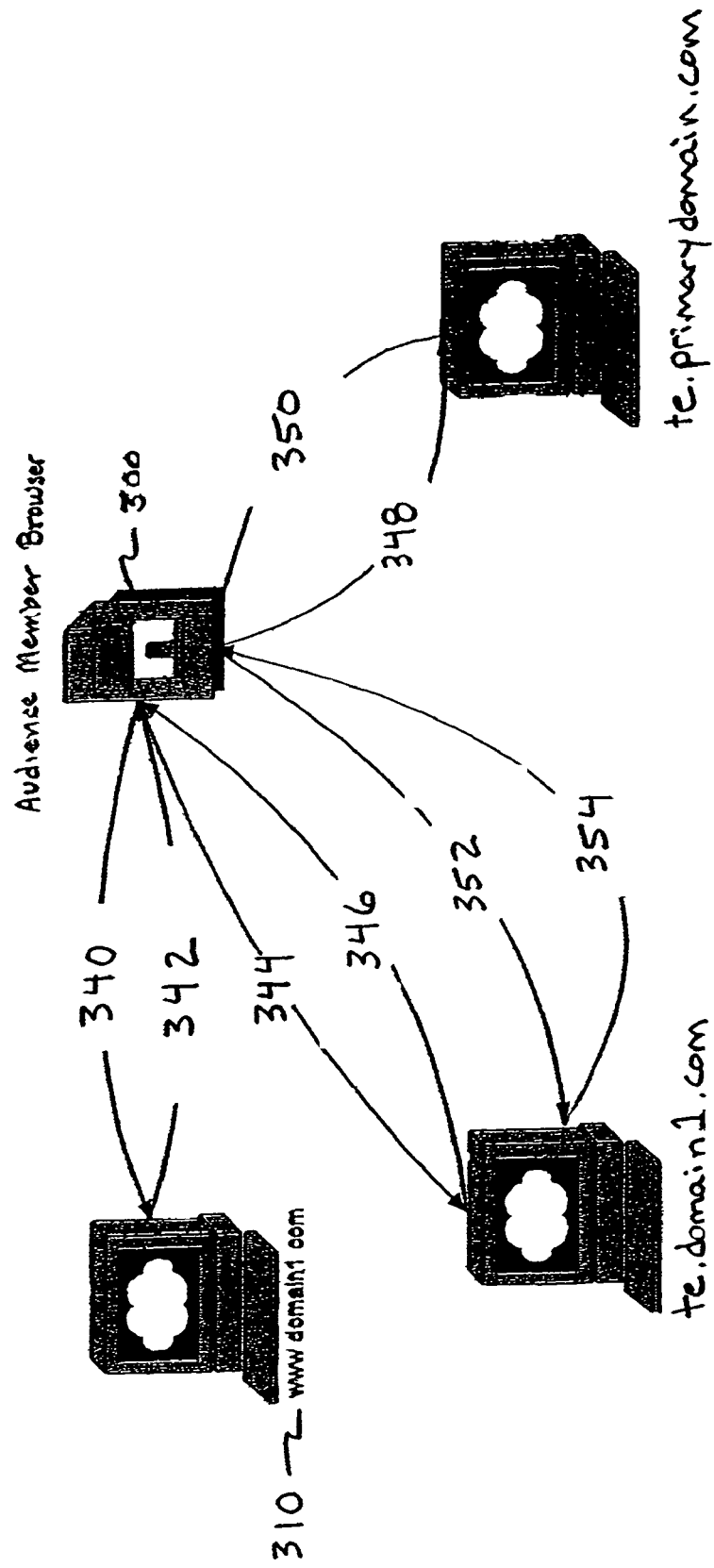
FIG. 4 is a flow diagram illustrating an example of tracking website pages visited by an audience member using a unique identifier.

A method of providing the unique identifier in each of the domain cookies associated with a number of related website pages is illustrated in FIG. 4. Each of the domain cookies associated with the website pages visited by the audience member may be modified to include the unique identifier by designating one of the related website page domains as the primary website domain. A primary domain cookie with the unique identifier is established for the primary website domain. Usually, a network will already have a domain that can be used for this purpose. If not, one of the domains in the network may be designated as the primary domain.

With reference to FIG. 4, an audience member browser 300 initiates the process in step 340 by requesting a website page from a site within the network, www.domain1.com 310. Responsive to the website page request directed to www.domain1.com 310, a page is returned to the browser 300 with an image tag which may reference the targeting engine 152 at te.domain1.com in step 342. In step 344, an image request is sent from the browser 300 to the targeting engine 152. If a unique identifier is not included in the request, in step 346 a redirect is sent to the browser 300 to the targeting engine 152 now referenced as te.primarydomain.com. The redirect includes a reference to the original targeting engine reference in step 344, te.domain1.com. For example, the redirect may be http://te.primarydomain.com/blank.gif?te.domain1.com. In step 348, the browser 300 may send this redirect request to te.primarydomain.com. Responsive to this request, in step 350 a primarydomain.com cookie containing a unique identifier for the audience member is assigned to the browser 300. In step 352, a second redirect is made of the browser 300 to te.domain1.com, that may include the same unique identifier as set in the primary domain cookie. For example, the redirect may be http:/te.domain1.com/blank.gif?tid=7dha6wlk9927sha. In step 354, the redirect request is returned with the originally requested image and a domain1.com cookie with the same unique identifier as the primarydomain.com cookie.

After the process illustrated in FIG. 4 is completed, an audience member visit to another website in the network, such as www.domain2.com, may result in a request for an image at te.domain2.com. If the Targeting Engine 152 does not detect a domain2.com cookie with a unique identifier following the image request, the Targeting Engine 152 may redirect a request to primarydomain.com for a cookie. Responsive to this request to primarydomain.com, the primarydomain.com cookie is read and a redirect is sent back to the browser 300 containing the unique identifier contained in the primary domain.com cookie. The unique identifier in the primarydomain.com cookie is the same as previously set. The requested image may then be sent to the browser 300 along with the domain2.com cookie which may have the same unique identifier as the primarydomain.com cookie. This process of providing a domain cookie with the unique identifier is carried out each time the audience member visits a new website page for the first time so long as the new website is related to the other websites in the network from the viewpoint of the Targeting Engine.

The Targeting Engine 152 may be a standalone web server, running on Apache, and using a MySQL database on a shared server, although the Targeting Engine 152 may be variously realized using alternative software and separate servers for Apache and the database. The Targeting Engine 152 may direct the setting of an additional cookie that may contain one or more segment identifiers. These cookies may then be used by other servers, such as, for example, an ad server, an email server, a streaming media server, and/or a web content server, to deliver targeted content to a particular audience member based upon one or more segments in the cookie.

With renewed reference to FIG. 2, the audience segmentation and analysis stage may be carried out by the data warehouse 132. The data warehouse 132 may assign a particular audience member to one or more segments based upon common profile characteristics. A segment of audience members may be defined as a group of audience members to which the system user (such as an advertiser) desires to send the same content. For example, returning to the example discussed above, a segment of audience members may be defined as all audience members that the system user selects to receive a particular golf advertisement. The selection of the audience members for receipt of this advertisement may be based on one or more audience member characteristics in the profile data.

Figure 5:
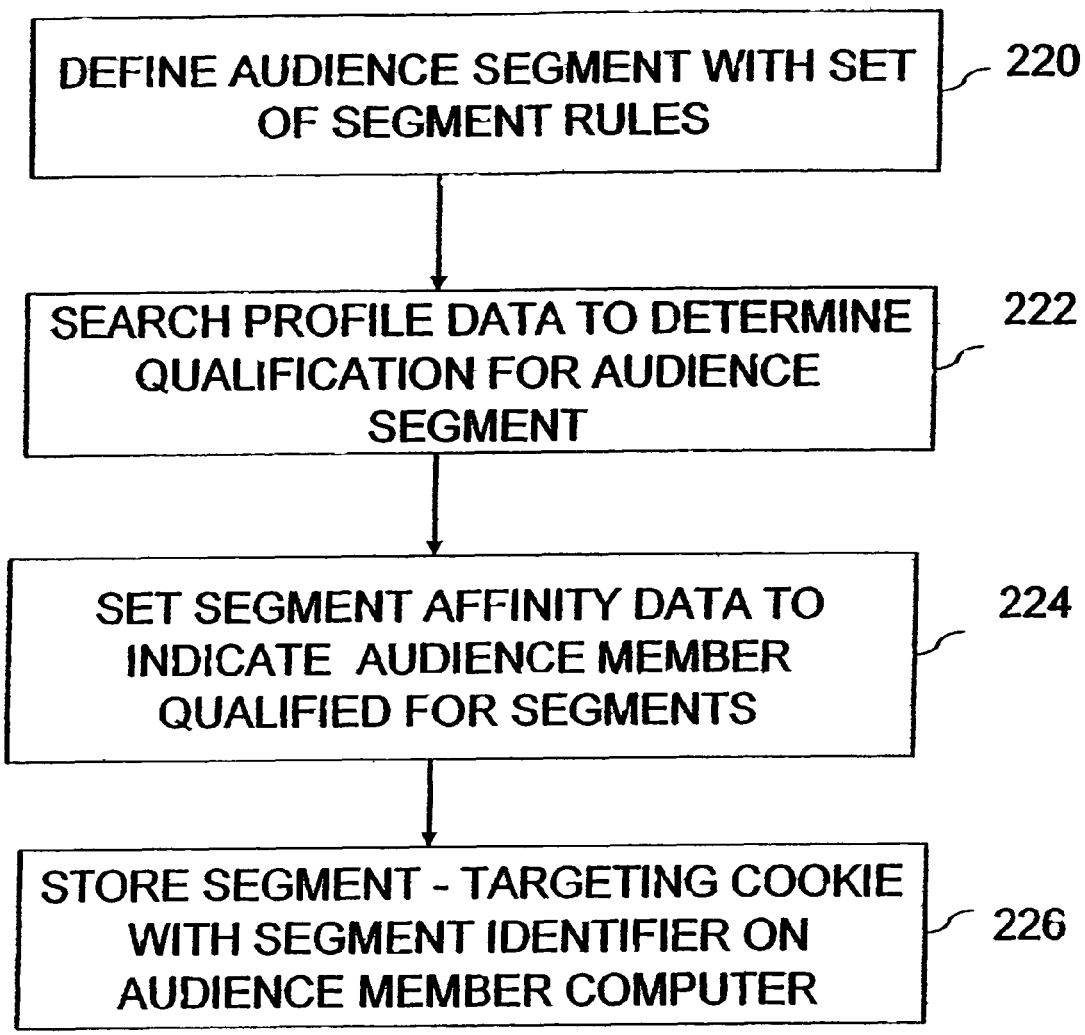
FIG. 5 is a flow diagram illustrating an example of grouping audience members into segments for receipt of targeted content.

A method of associating an audience member with a segment is illustrated in FIG. 5. In step 220, the profile data attribute values of audience members who will qualify for inclusion in the segment may be defined by a set of segment rules. The segment rules may be selected using the console 140. Any of number and/or range of profile data attribute values may be used to govern qualification for a segment. In step 222, the data warehouse 132 may search the profile data to determine the audience members that qualify for the audience segment. This search may be carried out at the request of the system user, and if desired, on a routine basis, such as daily. In this manner, membership in the audience segment may be maintained up to date. In step 224, the data warehouse 132 may store segment affinity data to indicate the audience members that are included in a particular segment. It is appreciated that the segment affinity data may indicate that an audience member is in more than one segment. The segment affinity data is defined by a set of rules based upon the behavior and characteristics in the audience profile. Once a set of rules that define the segment affinity data are identified, a segment identifier is assigned to that particular set of rules. This segment identifier is then sent to the Targeting Engine 152, along with the audience unique identifier assigned previously by the Targeting Engine 152. In step 226, when the Targeting Engine 152 is notified that an audience member has requested a website page in the network, the Targeting Engine stores a segment-targeting cookie on the audience member's computer. The segment-targeting cookie includes the segment identifier that identifies the segments that the audience member is included in. The method of storing the segment-targeting cookie on an audience member computer is described in further detail below in connection with FIG. 6.

Profile data for audience members may also be manually analyzed to build segments. With renewed reference to FIG. 2, the server or servers that host the Targeting Engine 152 and the data warehouse 132 may be operatively connected to the console 140. The console 140 may be used to designate the offline databases used to initially populate the data warehouse with profile information, to set the rules for collecting profile information, and to create and view reports showing audience member profile data, audience member segment affinity data, and audience member Internet activity.

Figure 6:
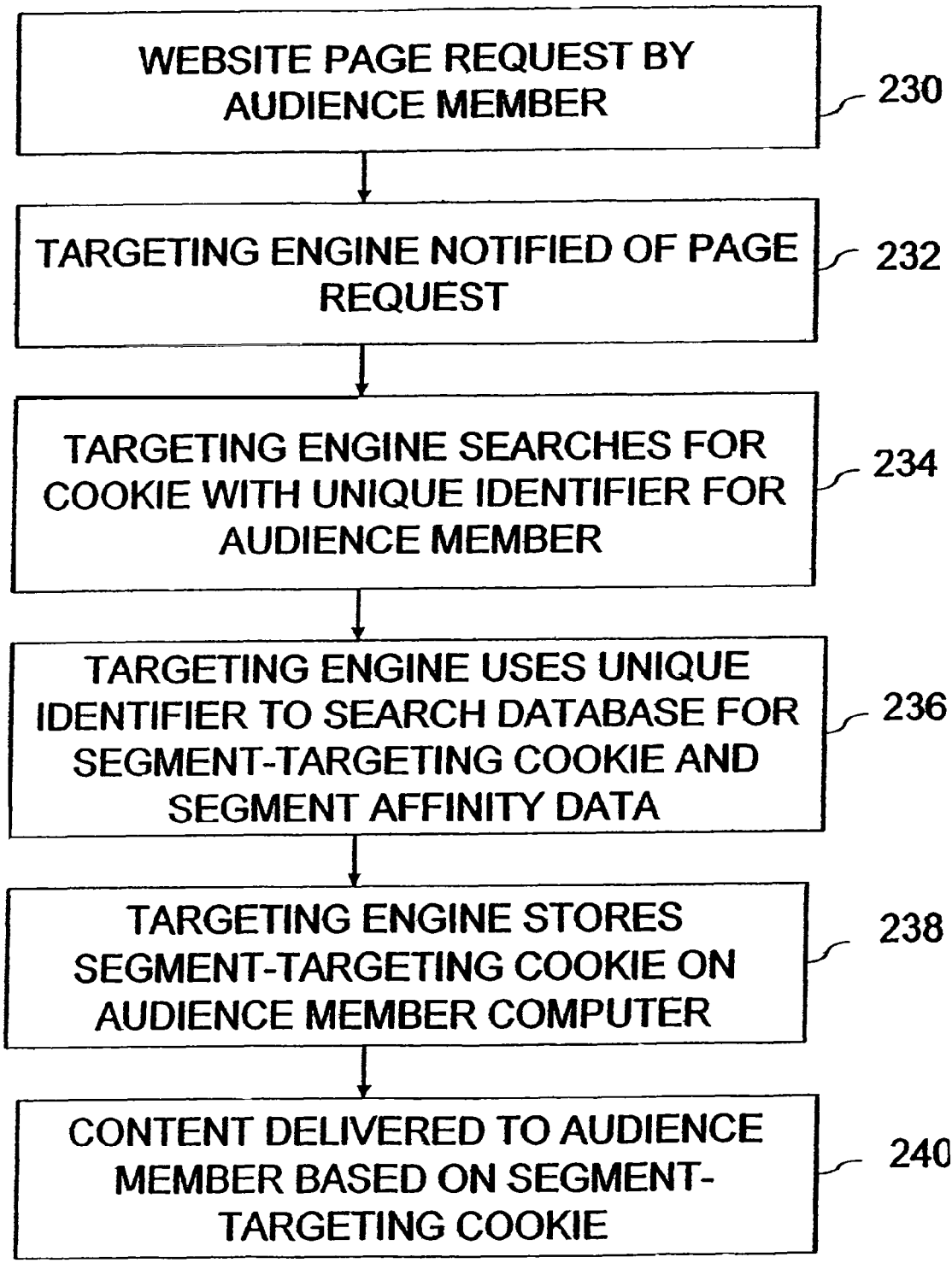
FIG. 6 is a flow diagram illustrating an example of directing targeted content to audience members in a segment.

A method of delivering targeted content to an audience member based on the segment affinity data is illustrated in FIG. 6. With reference to FIG. 6, an audience member requests a website page in the network of related websites in step 230. The Targeting Engine is notified of the website page request in step 232. Responsive to the audience members request for a website page, in step 234 the Targeting Engine determines whether or not a domain cookie, associated with the requested website page, includes a unique identifier for the audience member. If a unique identifier is not identified, the Targeting Engine will provide a website domain cookie with a unique identifier as described above in connection with FIG. 4. Once a website domain cookie is provided with a unique identifier, in step 236 the Targeting Engine may determine whether or not a segment-targeting cookie is already associated with the audience member in the data warehouse. The segment-targeting cookie may include a segment identifier that indicates the segment(s) to which the audience member belongs. If segment affinity data is stored in the data warehouse for the audience member, then a segment-targeting cookie is created and stored in the audience member computer with the appropriate segment identifier in step 238. In step 240, content may be delivered to the audience member based on the segment identifier in the segment-targeting cookie stored in the audience member computer.

If no segment-targeting cookie is identified in step 236, the Targeting Engine may query the data warehouse for any segment affinity data associated with the audience member. If no segment affinity data is stored for the audience member, a default segment-targeting cookie may be stored in the audience member computer. The default segment-targeting cookie may automatically expire after some fixed period of time, such as one day for example.

Once a segment-targeting cookie is stored on the audience member computer, the Targeting Engine may periodically update it with new segment affinity data for the audience member. Updating may occur automatically at fixed intervals, and/or in response to modifications to the profile data for the audience member.

A wide variety of content may be provided to the audience member as a result of the segment-targeting cookie being stored on the audience member computer. With renewed reference to FIG. 2, content may include, but is not limited to website page advertisements, pop-up advertisements, emails, or the like.

The system 10 of the present invention is adapted to segment and target audience members for delivering content to an audience member across a plurality of digital mediums. The digital mediums may be heterogeneous, and may include, but are not limited to, a website network, a cable system, a non-web based internet network, a wireless communications system, such as a cellular phone or RF network, and/or any digital medium in which the means for interfacing the audience member with the digital content is uniquely addressable. It is contemplated that the digital medium may include other consumer technologies not yet developed.

Figure 7:
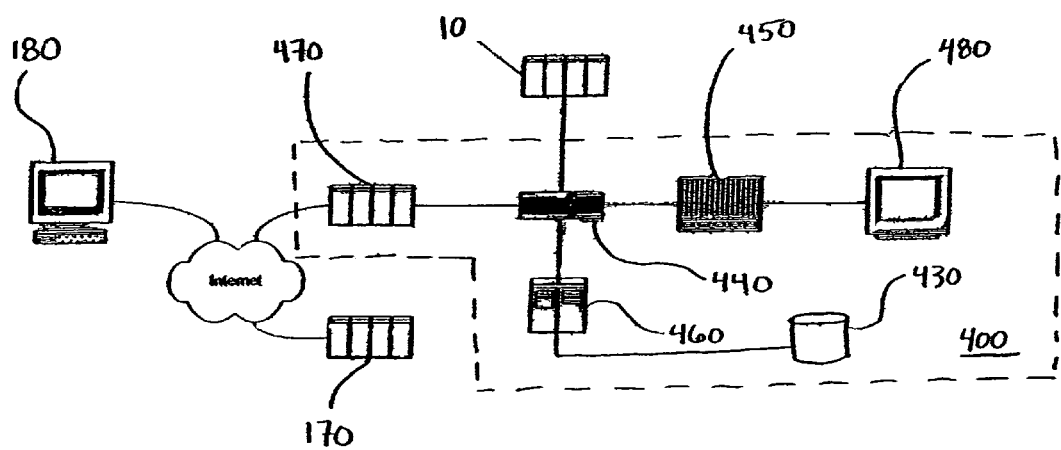
FIG. 7 is a block diagram illustrating another example of a system for delivering content to an audience member.

FIG. 7 is a block diagram illustrating another example of a system for delivering content to an audience member. The system includes a digital cable network 400. The digital cable network 400 may include a home television having a uniquely addressable cable set-top box 480 as a means for interfacing the audience member with digital content. The digital cable network 400 may further include a cable head-end 450 for delivering segment targeted content to the set-top box 480. As will be apparent to those of ordinary skill in the art, the head-end 450 may include means for receiving a digital signal, such as, for example, a satellite receiving antennae, from a programming processor 460. The programming processor 460 programs the content to be delivered to the audience member, and provides the appropriate digital signal to the head-end 450. The programming processor 460 may be in communication with a cable company database 430 which may store, for example, subscription data relating to the audience member. The data may include a unique identifier of the audience member within the cable network 400. The programming processor 460 may interface with the system 10 of the present invention through a cable network/Internet bridge 440. As discussed above, the system 10 may include an audience member profile.

The digital cable network 400 may further include a cable company website provided by a web server 470 and accessible by the audience member via the Internet. The audience member may access the website 470 to request a service, such as, for example, ordering a movie, placing a repair order, and changing the level of cable service. The audience member may access the website 470 by providing the audience member's cable network identifier.

The system of FIG. 7 may be operated as follows for delivering content to an audience member across a plurality of digital mediums. The audience member may visit a website provided by a web server 170. The web server 170 may receive a request for content from the audience member, and provide website pages to an audience member computer 180 in a conventional manner. The website 170 may be owned by, or affiliated with, the owner of the cable network 400 and the website 470. The audience member may visit other sites related to the website 170 within a network. If necessary, a unique audience member identifier related to the website network is assigned to the audience member, and profile data is collected and stored, substantially as described above in connection with FIGS. 3 and 4. The audience member may be associated with an audience segment defined by a set of segment rules substantially as described above in connection with FIG. 5.

The audience member may visit the website 470 to request a service from the cable company, at the same time providing the audience member's unique identifier within the cable network 400. The programming processor 460 may read the audience member's web network identifier, and associate the audience member's cable network identifier with this identifier. The programming processor 460 may then access the system 10 through the bridge 440, and accesses the segment affinity data relating to the particular audience member using the web network identifier. Based on the audience segment affinity data, the programming processor 460 defines the programming rules for the audience segment within the cable network 400. The appropriate digital signal is then sent to the cable head-end 450, and the head-end 450 delivers the audience member targeted content via the set-top box 480 and the audience member's home television. The preferences and behavior of the audience member within the network 400 may also be used to update the member's profile within the system 10. In this manner, the audience member's preference and behavioral data is synchronized across a plurality of mediums into a common profile, and the content delivered to the audience member via those mediums may be customized based upon the characteristics of the profile.

Figure 8:
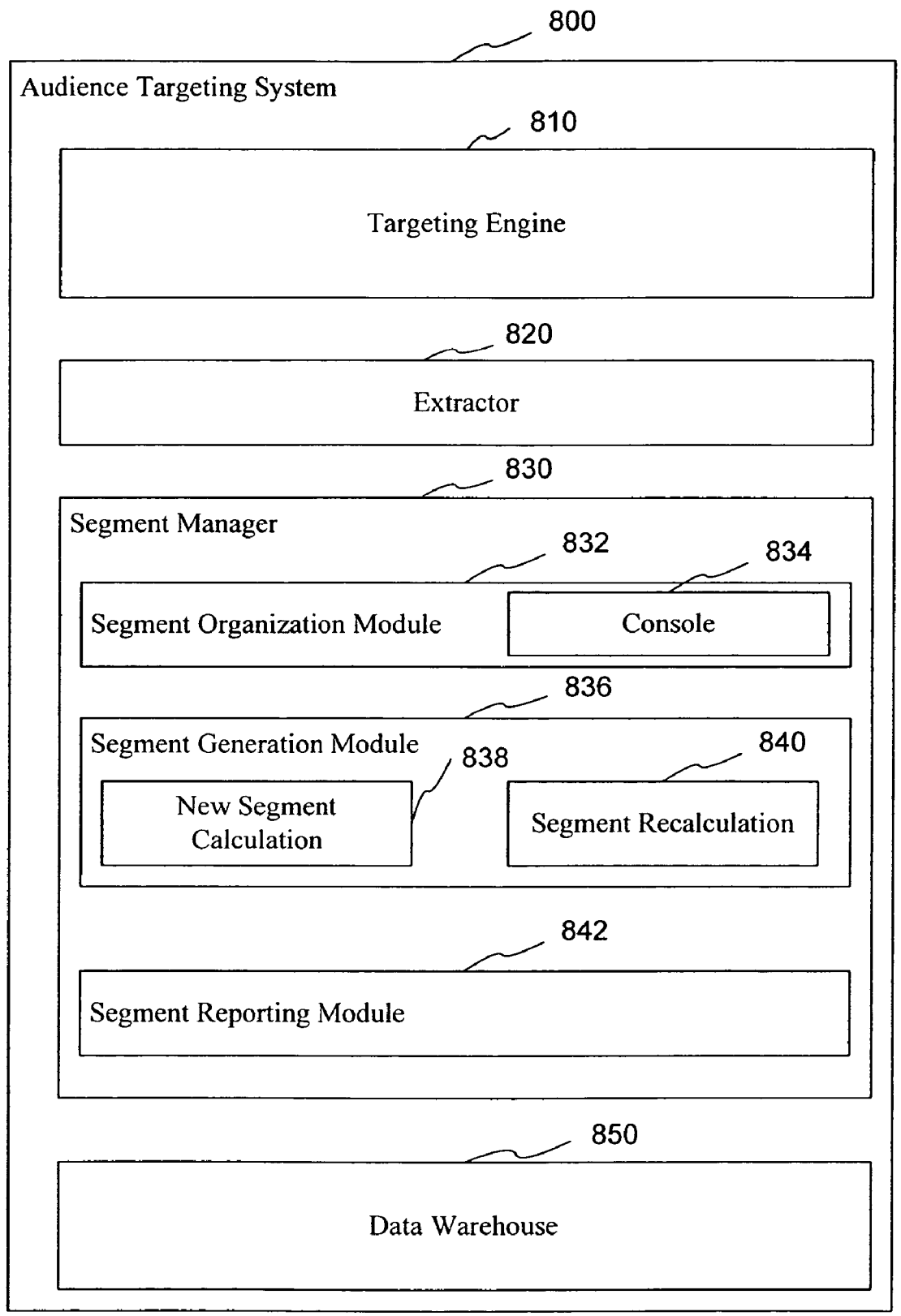
FIG. 8 is a block diagram illustrating an example of an audience targeting system that includes segment management according to one aspect of the present invention.

FIG. 8 is a block diagram illustrating an embodiment of an audience targeting system 800 that includes a targeting engine (TE) 810, extractor (Extractor) 820, segment manager (SM) 830, and data warehouse 850.

The audience targeting system 800 and its components are illustrated collectively for ease of discussion. As described previously, the various components and corresponding functionality may be provided individually and separately if desired, such as by different servers that are assigned to the functionality of one or more of the components.

The functionality of the audience targeting system 800 is preferably provided by software that may be executed on any conventional processing system, such as those previously named or others. In that regard, the audience targeting system 800 may in turn be a component of a computer system containing a processor and memory. Although one modular breakdown is shown, it should be understood that the described functionality may be provided by greater, fewer and/or differently named components. Although a software embodiment is described, the audience targeting system 800 may also be provided as hardware or firmware, or any combination of software, hardware, and/or firmware.

As previously described, audience segments may be variously calculated, such as on a periodic basis. One model for accommodating audience segment calculation is a batch processing model. For example, at 24 hour intervals the Audience Targeting System 800 may prompt a recalculation of all necessary audience segments based upon previously extracted data as well as any newly extracted data that had been discovered since the previous batch process. While this model is useful for many applications and for certain types of extractable data (e.g., data from registration sources, surveys and $3^{rd}$ party data), it is not always the best model to implement. One issue with the batch processing model is that it can become computationally expensive, particularly where audience segments are recalculated based upon not only previously extracted data, but the newly extracted data. Another issue is that certain data sources may contain data that should be acted on more frequently than dictated by the batch processing interval.

Figure 10A:
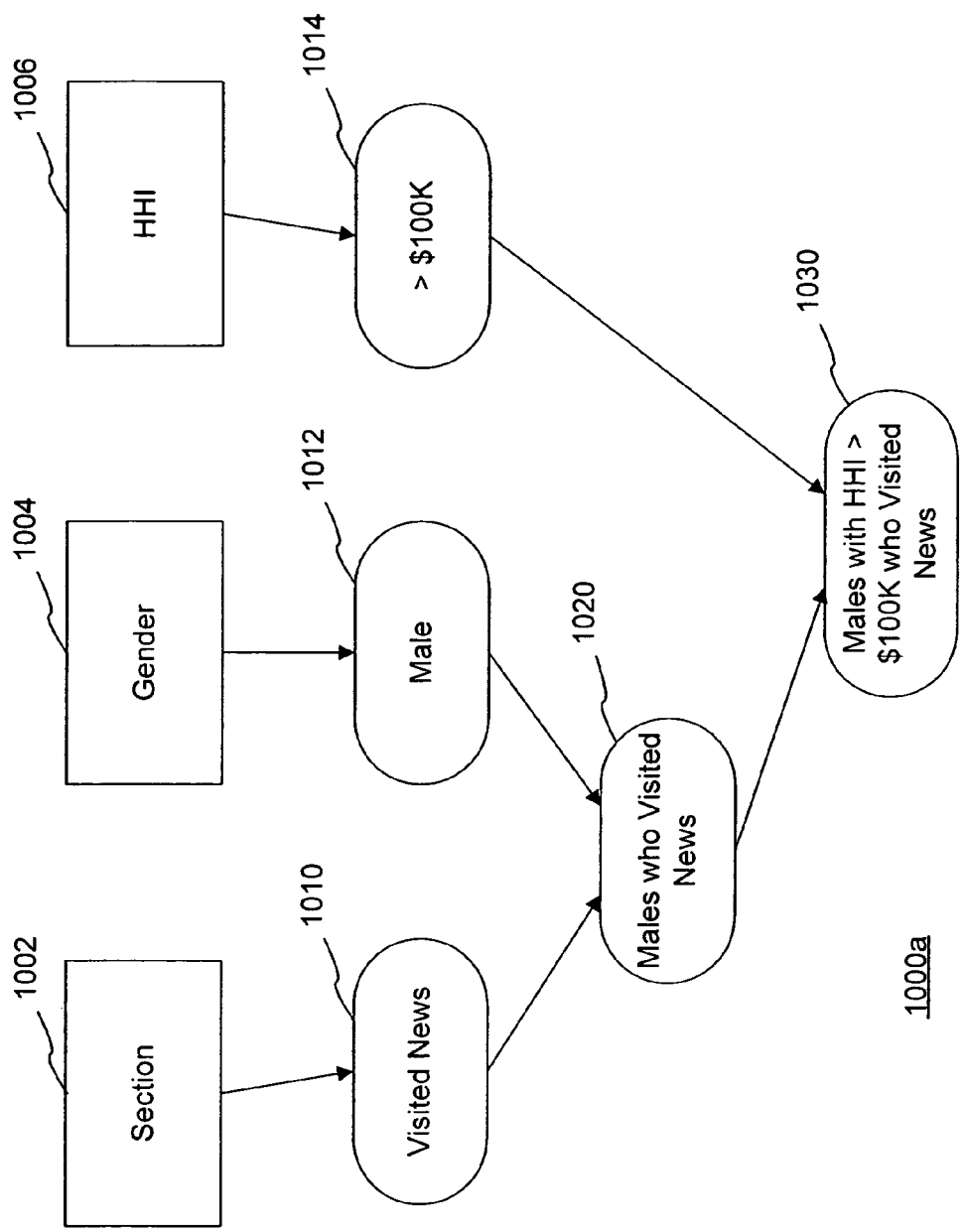
FIGS. 10A-B are schematic diagrams illustrating an example of a segment management architecture and corresponding calculation of segments according to another aspect of the present invention.

The example of the Audience Targeting System 800 illustrated in FIG. 8 accommodates what is referred to as a continuous processing model. Various aspects of the present invention are useful for supporting continuous processing (although it should be noted that these aspects are also useful for any processing model, not just continuous processing). According to one aspect, techniques and a corresponding infrastructure support the regular mining and sending of data to the Extractor 820. This may be referred to as "dock and shuttle" data extraction support and is described further in connection with FIG. 9 below. Another aspect is provision of the segment manager 830 and its corresponding implementation of the segment management architecture that is described further in connection with FIGS. 10A-B below. Additional aspects include recalculation of audience segments based upon incremental data, and processing data tables to manage and produce audience segments as described further in connection with FIGS. 11A-B. Each of these aspects may be practiced individually or may be variously combined in a particular embodiment as desired.

Still referring to FIG. 8, the Audience Targeting System 800 accommodates the collection and coordination of data across multiple sites, as well as the targeting of audience members. In that regard, a user that wants to target a particular audience defines audience segments of interest. The audience segments correlate to user profile data that may comprise both characteristic and behavioral data. The characteristic data is often found in registration data and includes attributes such as age, gender, ZIP code, and household income. On the other hand, behaviors may include attributes such as which sections were viewed on a site (e.g., sports, entertainment, health), which advertisements were seen (e.g., mortgage rates, allergy medication), referrers (e.g., AOL, Yahoo), the time of visiting the site (point in time, or range), and the frequency of visits to the site. Audience segments may be defined based upon such user profile data. In turn, the audience segments form the basis for the information that is extracted for analysis, reporting and targeting audience members in relevant segments.

Audience targeting in accordance with the present invention is not limited to web applications. For example profile data might include behavioral attributes such as programs viewed, time viewed, etc., and characteristic attributes such as subscriber IDs or the like in applications involving a television set top box.

The TE 810 provides the means for assigning and coordinating unique identifiers corresponding to individual audience members. As previously described, when an audience member logs onto a page for the first time, the TE 810 places a cookie on their browser, which contains a unique identifier. Whenever that audience member returns to the site, the unique identifier is sent back to the TE 810. Based upon the unique identifier, the Audience Targeting System can set a segment cookie, which can be used for the delivery of targeted content such as ads, e-mails, etc. to the audience members computer or other relevant device. The TE 810 may also create logs of this activity. The unique identifier may be referred to as a profile identifier (PRID).

Another example of an extractor 900 is further described with reference to FIGS. 9A-B, which respectively are a block diagram illustrating an embodiment of an extractor 900 and a schematic diagram that exemplifies a model for extracting profile data. Although particular terms such as dock and shuttle are used because they are helpful in conceptually illustrating this aspect of the present invention, it is noted that various alternative terminology may be used for elements that perform the same functions.

The Extractor 900 includes a shuttle 902, dock 904 and extraction module 906. The functionality of the so-configured Extractor 900 is best understood with concurrent reference to FIG. 9B, which also refers to other elements. The shuttle 902 may be code that resides on the data source. Its purpose is to mine local data locally and send it to the extractor (more specifically, the dock 904 on the extractor). In one embodiment, the shuttle 902 accomplishes this by assembling boxes. The dock 904 receives boxes and, when sufficient boxes are available (or a timeout occurs) creates a pallet 908 out of the boxes. The extractor works on those pallets 908. In order to accomplish this reliably, it is useful for the shuttle 902 to know where the source data resides. For the previously mentioned batch processing embodiments, it is also useful for the shuttle to handle the situation where log files "roll" and are archived by the customer. In this regard, the shuttle 902 interfaces with log data such as that provided by conventional log file generating elements (e.g., Apache).

A data agent may also be employed to assist in the gathering of information from website visitors. This may be provided in the form of code that is added to those pages in connection with which data collection is sought. The code may have header and function call portions that respectively identify the functions and variables that it needs to operate and ensure that all variables have been collected. The data agent may be configured to produce log lines suitable for receipt and processing by the TE. Examples of parameters include the version of the data agent, the page referrer, the page URL, time information, and the PRID. As will be described below in connection with profile synchronization, a REGID parameter may be provided as well. In addition to association with PRID as described, a cookie may delineate a unique REGID for an audience member in the same fashion. Another "cookie list" (CLIST) parameter may be used to identify the list of cookies that should be captured.

The dock 904 is the receiving area on the Extractor that manages the ordering and processing of pallets. Data from the shuttle 902 may be grouped into what is referred to as boxes. Generally, a box contains a single event, but in some cases (e.g. OAS logs) a single record may contain several events. An event may be a time tagged user action on a source server. Examples of events may include a web page view, an ad impression, etc. A pallet 908 may be a collection of boxes, and is typically a collection of data mined from the data source and packaged for delivery to the extractor dock 906.

Various data sources may be supported by this model, but in one embodiment web log data is the data source. The shuttle 902 may be a persistent C++ application that processes data from a log file or pipe. Upon startup, the shuttle 902 finds the current log file (or pipe) and opens it for reading. In addition, the shuttle 902 establishes a connection to the dock 904 in order to be able to deliver pallets 908 to the extraction module 906 for processing.

The shuttle 902 may be configured to process data in a persistent loop until an unrecoverable error or external termination signal occurs. During the processing loop, the shuttle 902 reads up to a configurable number of available items (log lines) from the source and packages them into a box. If there are more items available than the maximum number of items, or if the total size of the items are greater than the maximum box size, the extra lines are written into an overflow buffer and will be inserted first into the next box created.

Once the box has been created, the shuttle 902 sends the box to the dock 904, along with an indication of the size of the box for validation purposes. The extraction module 906 acknowledges and validates the box and responds with an acceptance signal before the shuttle 902 will drop the existing box and repeat the processing loop.

More than one shuttle 902 can connect to a given dock to allow for multiple machines which all serve the same data source (e.g., multiple web servers responding to a single domain via a load balancer). Data from different shuttles 902 in a given dock is sorted into bays. These bays contain the unprocessed data for a given data source from a given shuttle.

The extraction module 908 is preferably configured to handle each data source type, and may include sub-modules for each different data source type (e.g., one for each of OAS, W3C, IIS, etc.).

Finally, the extraction module 906 is responsible for processing data as pallets from the dock 904 and creating the output that gets sent to the data warehouse 850 for final import processing. Basically, the extraction module 908 component performs extraction as described in connection with the previously described embodiment of the Extractor (from FIGS. 1-7). The processed data may be referred to as profile data. In one embodiment, the profile data may be organized and thus provided as fact tables that are described further below.

The segment management aspect is now further described with reference to FIG. 8, which illustrates the segment manager 830 to include a segment organization module 832 that includes a console management module 834, a segment generation module 836 that includes a new segment calculation module 838 and a segment recalculation module 840, and a reporting module 842.

The segment manager 830 accommodates the definition and management of segments corresponding to audience members based upon characteristic and behavioral information. The segments are organized according to a hierarchical logical tree based architecture that allows scalable segment management and accommodates incremental recalculation of segments.

The segment organization module 832 facilitates user-definition of audience segments according to this architecture. It operates in conjunction with the console manager 834 which provide interfaces that allow users to define and configure segments according to the same logical architecture. These interfaces may be in the form of panels that illustrate segments and combinations of segments to produce new segments which will be further understood upon explanation of the architecture below.

The segment generation module 836 generates segments comprising appropriate audience members based upon the so-defined audience segments. The new segment calculation module 838 calculates new segments, and the segment recalculation module 840 calculates existing segments, in particular taking incremental data and recalculating such segments, thus avoiding the need to fully calculate the segment as though it were new each time new data arrives.

The segment generation module 836 may be configured to process segments continuously (e.g., as a Windows service). For each pass, the segment generation module 836 reads a table in the database warehouse 850 that catalogs segments, to determine which segments it should process on that pass. A type identifier associated with the segments may indicate whether the segments are to be calculated anew, and thus passed to the segment calculation module 838, or incremental, and thus passed to the segment recalculation module 840.

Finally, the reporting module 842 communicates with the segment organization 832 and segment generation module 836 and produces customizable reports. The designer is free to structure the reporting options as desired. One example of a report is a "Known Audience Inside/Outside" report, which reports on the behavior of an audience segment in the sections outside the section behavior that defines the segment. For example, An Inside/Outside report on viewers of the News section would show the audience members behavior inside news and compare that to all other sections of the site. This may be used to target valuable behavior on other parts of the site. Another example of a report is a "Reach and Frequency Report", which reports on the reach (total audience) and frequency (number of times seen) for one or more ad campaigns. The reporting module 842 may implement conventional reporting tools including but not limited to Crystal Reports as provided by Business Objects SA, San Jose Calif.

Figure 11A:
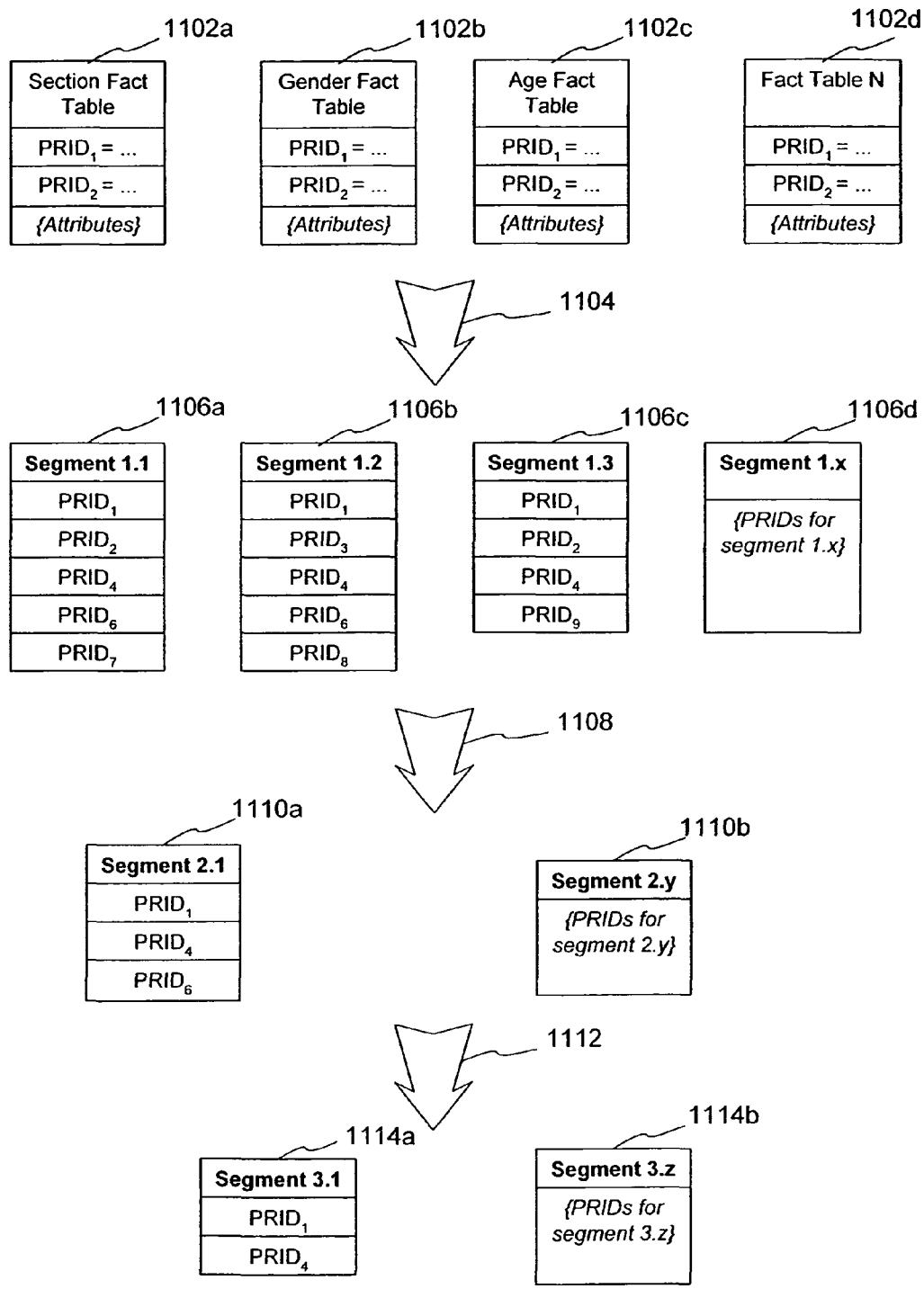
FIGS. 11A-B are schematic diagram illustrating an example of processing data tables to manage and produce segments according to another aspect of the present invention.
Figure 11B:
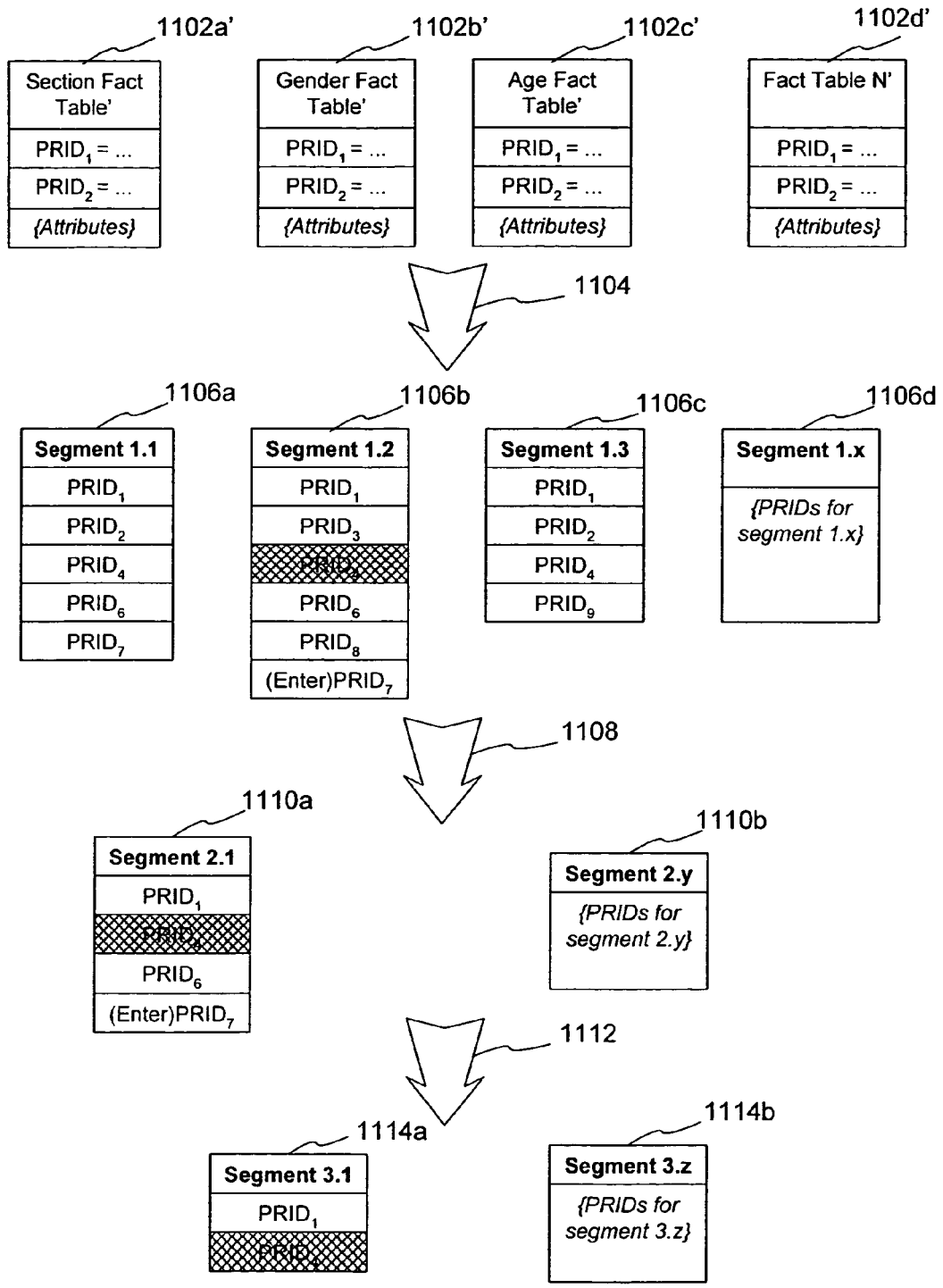

FIGS. 11A-B are schematic diagrams illustrating an example of a segment management architecture 1000(a-b) and corresponding calculation of segments according to another aspect of the present invention. As introduced above, the profile data includes attributes that are correlated to audience members, and is the basis of the audience segment definitions that are used to target audience members with advertisements and/or other content.

Profile data may also be organized as "facts" that have one or more attributes. For example an "Age" fact may have one attribute—Age. However, an "ID" fact may have several attributes such as the PRID or a registration identifier (REGID) that uniquely identifies registration at the site. A "Section" fact may contain attributes for the Section, top level Section (that is, if Section is /News/International/Politics, Top Level Section would be /News), second level section (/News/International), site (site that section belongs to) and full path (Site+Section).

Profile data and the individual attributes comprising the profile data may be categorized as being (1) Characteristics (e.g., Age, Gender, Household Income); (2) Behaviors (e.g., Page Views, Ad Clicks); (3) PRID; or (4) Business Unit ID, which describes the site that a behavior occurred on.

The attributes may also be said to have dimensions or values that may be defined in tables for ease of computation. Moreover, attributes may be further defined based upon whether they are single or multi-valued. For example, Age, Gender, HHI are characteristics for which an audience member will only have a single value (e.g., an audience member cannot be both Male and Female). Conversely, behaviors have multiple values per audience member and some characteristics (e.g., e-mail newsletters subscriptions) also have multiple values.

The hierarchical architecture facilitates efficient calculation of the membership of audience segments. Lists of audience members belonging to particular segments may be maintained. These membership lists may be logically combined to determine the membership of dependent (e.g., child) audience segments.

As indicated, the segment management architecture 1000a includes a series of attribute segments, namely Section 1002, Gender 1004, and Household Income (HHI) 1006 as provided in this example. Base segments have attributes with particular values that correlate to relevant attribute segments 1002-6. Base segments for any number of attributes could be provided (e.g., different behaviors different sections; different gender, different HHI). The illustrated segments are "Visited News" 1010, "Male" 1012, and "HHI>$100K" 1014. Each of these may be considered as separate and distinct segments. However, these segments may also be logically combined to create new segments that depend from them. For example, the segment "Males who have Visited News" 1020 comprises a logical combination of the Males 1012 and Visited News Last 1010 segments. Still further, a third level in the hierarchy of segments may be defined as "Males who have Visited News with HHI>$100K" 1030, which comprises a logical combination of the previously described segment 1020 with base segment 1014 (HHI>$100K). In this fashion, the system may variously organize segments, and this same organization can be used as the basis for guiding the user through the definition of segments via the console manager 834. Notably, there may be instances where a user defines a complex segment directly, wherein the system automatically generates the base and any intervening segments accordingly, to facilitate calculation and recalculation of segments.

For ease of illustration, a logical "AND" operation has been described, which basically provides the intersection of two parent segments. The segment manager 830 supports various additional logical operations or set expressions, including "EXISTS", which inserts entries from one parent; "OR", which inserts entries from the union of two parents; as well as "exclusive AND", and "exclusive OR". Attribute expressions may also be used, such as one which inserts entries from a given parent segment that match specified criteria.

In addition to providing improved organization of segments, the segment management architecture 1000a facilitates proper maintenance of a segment population where incremental profile data is processed, without requiring a full calculation of the segment. That is, introduction of the new information to the existing segment is accommodated through limited processing involving the new information, in lieu of calculating the segment based upon application of its definition to the cumulative set of data. To accommodate this, entry and exit rules are implemented. An "entry" corresponds to an introduction of audience members to a particular segment based upon the incremental data, and an "exit" corresponds to a removal of audience members from a segment. Entries are basically audience members found to currently meet the criteria, but whom are not yet associated with the previously calculated segment. Exits are the opposite—they are audience members found to no longer meet the criteria.

Figure 10B:
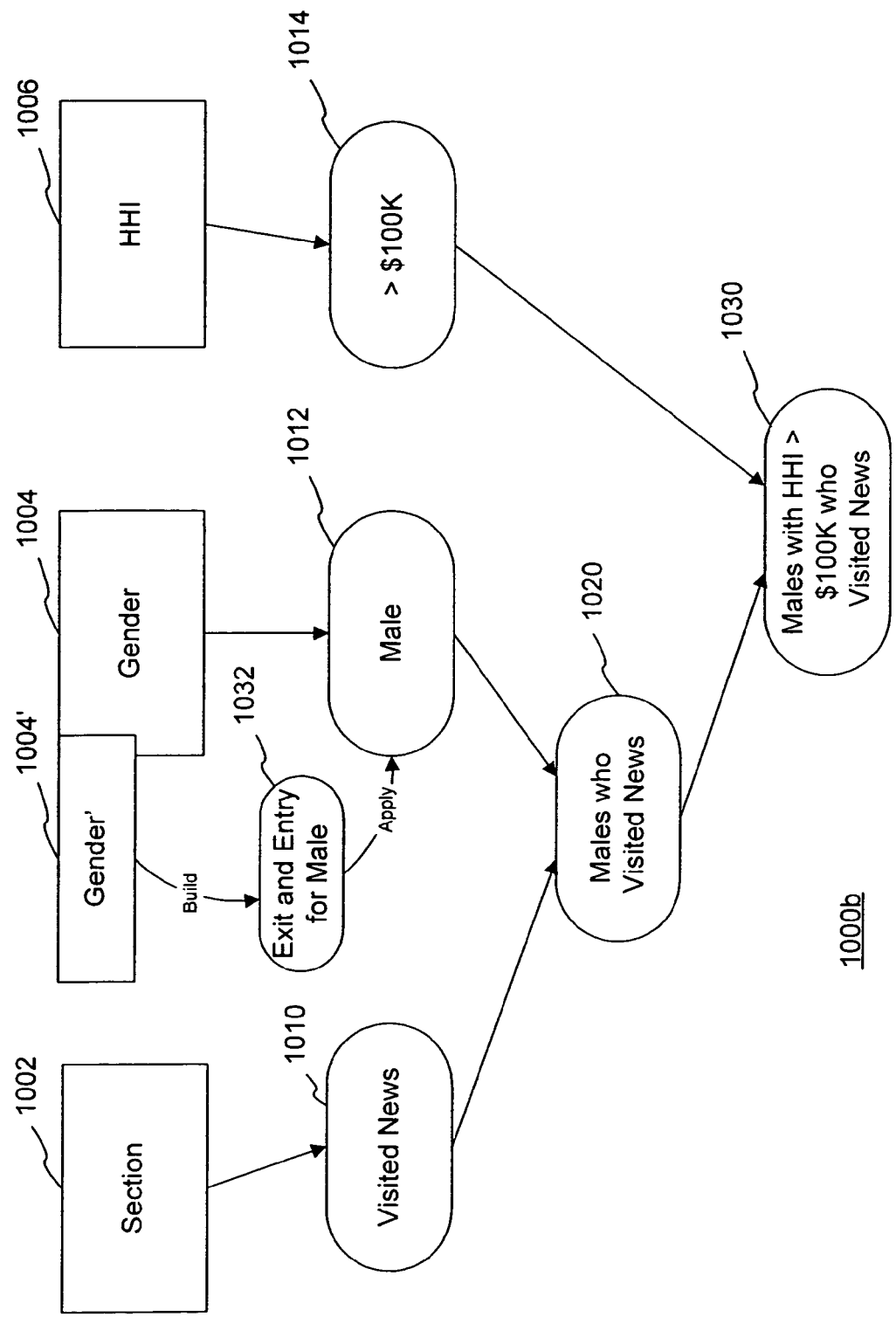

FIG. 10B illustrates an entry and exit 1032 functionality for the segment management architecture 1000b. As described above, the Extractor continuously populates the data warehouse with profile data that identifies various attributes. As indicated, a Gender' attribute segment 1004' is generated responsive to incremental profile data. This generally represents audience members that have attributes defined under the attribute segment "Gender" within the incremental profile data. Among those are the previously described "Male" segment 1012. In that regard, exit and entry membership lists are built. Specifically, all audience members identified as being male in the incremental profile data are provided in an entry membership list for the Male segment 1012. Similarly, all those audience members who do not have the relevant attribute (which may be referred to as "not male") are provided in an exit membership list for the Male segment 1012. Exit and entry rules are then used to determine how to accommodate an appropriate update to the segment. The entry may be accommodated by taking the union of the existing membership in Male 1012 with the membership list in the entry membership list for Male. The exit may be accommodated by removing from the existing membership in Male 1012 those audience members listed in the exit membership list (actual removal, of course, would only be applicable for those present prior to the recalculation).

For ease of discussion, focus is made on incremental profile data as it relates to Gender, but the principle of exit and entry can apply to any segment including but not limited to Visited News, HHI and others.

Incremental profile data based recalculation also propagates through the hierarchy. This may be variously arranged, again depending upon exit and entry rules, which in turn depends upon the logical relationships of the segments. For a dependent (child) segment resulting from an AND operation such as Males who Visited News 1020, this may comprise repeating application of the above-described entry and exit membership lists for "Male" to the segment Males who Visited News 1020 in a similar fashion. That is, the entry membership list for Males would be added to the Males who Visited News 1020 segment, and the exit membership list removed. Alternatively, base segments Male 1012 and Visited News 1010 could be recalculated with their respective entry and exit membership lists, and then Males who Visited News 1030 could be calculated based upon the intersection of the updated versions of Male 1012 and Visited News 1010.

If desired, recalculation of a dependent segment could also be based upon a calculation based upon the updated parent segments. Specifically, the entry and exit 1032 functionality could be applied to the base segments, which could then be used to FIG. 11A is a schematic diagram illustrating an example of processing 1100 data tables to manage and calculate segments according to another aspect of the present invention. The illustrated processing correlates with the segments that are defined in the example of FIGS. 10A-B. As described, the Extractor operates to collect information about numerous audience members and provides such information in the data warehouse. That information may be organized so that attributes corresponding to individual audience members may be identified. The illustrated fact tables 1102*a-d* are a preferred technique for organizing the information as such. In one embodiment, each fact in a fact table is associated with an audience member using their unique identifier (PRID). A fact table contains all facts related to all users for a particular attribute. Accordingly, there is a section fact table that contains all section facts, an age fact table, a gender fact table, etc. Each row in a table represents a piece of data (characteristic or behavior) associated with only one audience member (more specifically one PRID).

As described attributes may involve characteristics such as age and gender as well as behaviors such as the number of times that the audience member has visited a particular section (News, Sports, etc.). At times, an attribute may be determined by looking at multiple pieces of information. Thus, while gender may be a simple determination of whether gender="male", an attribute that includes frequency information such as how many times an audience member visited a particular section may involve counting the number of entries in a fact table for the audience member. This counting may also be constrained to those entries falling within a particular time period.

Various alternatives may be used to provide the functionality of the fact tables, including different organization of the information. For example, the system may alternatively construct a table that provides a listing of attributes for a user identified by a unique PRID. This would result in a number of fact tables respectively corresponding to unique audience members identified by their PRIDs.

As previously described, the Segment Manager accesses the information stored in the data warehouse and maintains segment definitions, such as those input by the user seeking certain audience segments. A given segment is calculated by determining which audience members have the attribute for the given segment. According to this aspect of the present invention, the association of audience member identifiers to attributes and hierarchical logical tree based segment architecture accommodate very efficient calculation (and recalculation) of segments.

A first level of processing 1104 may be used to calculate base segments. This is done by identifying the attribute for a base segment and then determining the audience members (or more particularly the listing of PRIDs) that have that attribute. Presume that segment 1.1 is the "Visited News" segment (see FIG. 10A). In this instance, the Segment Manager examines the fact tables and collect the PRIDs for those fact tables that contain this attribute. As indicated in segment table 1106*a*, this may result in a determination that PRIDs 1, 2, 4, 6, and 7 have the given attribute. The listing of PRIDs in a segment table may also be referred to as the "membership list" for the given attribute/segment. Again, there may be millions of members in a segment, the limited listings are used for ease of illustration.

The segments may also be identified by identifiers (SEG-IDs) in lieu of the words and phrases that identify them. Thus associating identifiers $SEGID_{x.x}$ with the noted PRIDs efficiently identifies the audience members with the attribute for computational purposes. Each segment may be organized in this fashion.

Continuing with the example, segment 1.2 may correlate to the attribute "Male". Audience member $PRID_1$ is identified as male, and is listed in the segment table for segment 1.2, but $PRID_2$, identified as female, is not. The table 1106*c* for segment 1.3 (HHI>$100K) includes both of those PRIDs. Again, segment tables for each of the segments may be provided, for x base level segments (1106*a-d*).

A next level of segments may then be calculated 1108 from the base segments. This aspect of the present invention accommodates efficient determination of further levels of segments through application of various Boolean operations to the existing segment tables. For example, Segment 2.1 may have been defined as "Visited News" AND "Male". This is accommodated by determining the intersection of the PRIDs in those two segment tables (1106*a*, 1106*b*). As illustrated, the segment table 1110*a* for segment 2.1 thus includes $PRID_1$, $PRID_4$, and $PRID_6$ since those identifiers appeared in both of the two base segment tables. Table 1110*a* thus lists audience member identifiers for the males who have visited News. Once again, any number of segments may be calculated 1108 at this level, denoted as tables for segments 2.1 through 2.y (1110*a-b*).

Still further calculation 1110 accommodates determination of the next level of segments. Segment 3.1 ("Males who have visited News with HHI>$100K") correlates to a combination of Segment 2.1 (Males who have visited News) and Segment 1.3 (HHI>$100K). Again, the logical AND implements the intersection of the relevant segment tables, which results in listing $PRID_1$ and $PRID_4$ as belonging to segment 3.1, per segment table 1114*a*. Any number of z segments may be calculated 1112 (segment tables 1114*a-b*).

The segment tables are the membership lists for their respective segments, and may be updated accordingly responsive to segment recalculation upon receipt of incremental profile data as previously described. FIG. 11B illustrates how the segment tables are updated responsive to recalculation based upon receipt of incremental data. Here, entry and exit is accommodated by tables containing membership lists, or entry tables and exit tables. As previously described incremental profile data (denoted respectively as fact tables 1102*a'-d'*) is received, and entry and exit tables are built based upon such data. FIG. 11B illustrates how the information in the entry and exit tables is useful for recalculating segments. Suppose that the entry table for the "Males" Segment 1.2 includes $PRID_7$ and the exit table for the same segment includes $PRID_4$. Application of the exit table would prompt $PRID_4$ to be removed from "Males" Segment 1.2 (as denoted by cross-hatching). Application of the entry table would cause $PRID_7$ to be added to the segment (as denoted "entry"). The membership of dependent segments is also updated according to the previously described logic. That is, because $PRID_4$ is no longer a member of Males Segment 1.2, it is also removed from dependent segment Males who have Visited News 2.1. Continuing to the next level of dependency $PRID_4$ is removed from Segment 3.1, but $PRID_7$ is not added because Segment 3.1 is an AND combination of Segments 2.1 and 1.3, and $PRID_7$ is absent from Segment 1.3.

Note that different logical combinations will prompt different application of entry and exit upon recalculation. Segment 2.1 is a logical AND of Segments 1.1 and 1.2; if it were a logical OR combination of those segments, then $PRID_4$ would not be removed unless it was also removed from Segment 1.1.

Another aspect of the present invention provides profile synchronization. People may access various computers throughout the day and week, such as a home computer, office computer, mall kiosk, or the like.

As described above, PRIDs are unique identifiers that are used to identify and gather data regarding unique audience members. In that regard, when a new visitor (e.g., a woman using her office computer) to a web site is encountered, they are associated with the next available PRID (e.g., $PRID_A$). Cookies implemented in conjunction with the visitor's browser then include the particular $PRID_A$ and are used to collect profile data for that visitor. Later on, the same person may use her home computer to visit the web site. Presuming that the home computer has not been used to access the site, there will not be recognition that she is the same person, and a new unique PRID ($PRID_B$) will be generated and associated with her behavior and characteristics from that computer. There will thus be two separate sets of profile data that actually correspond, unbeknownst to the Audience Targeting System, to the same person.

Further, the person may use another computer (e.g., mall kiosk) that accesses the web site, and yet another unique $PRID_C$ may be issued. This is problematic in two ways. First, it creates a third separate PRID for activity corresponding to the same person. Also, the mall kiosk (or even home and office computers) may be used by multiple people. Even though multiple different people are using the computer and engaging in various behavior, it will all be tracked as $PRID_C$.

Still another problem is potential deletion of cookies. Continuing with this example, if this audience member deletes cookies on her office computer, then correlation with $PRID_A$ is lost and she will be perceived as a new visitor on the next web site visit, prompting issuance of $PRID_D$ in association with her office computer. This is problematic because the segments associated with $PRID_D$ will not reflect information previously gathered in connection with $PRID_A$. Also, $PRID_A$ will essentially become a defunct PRID, but will still be wastefully processed by the system.

Figure 12:
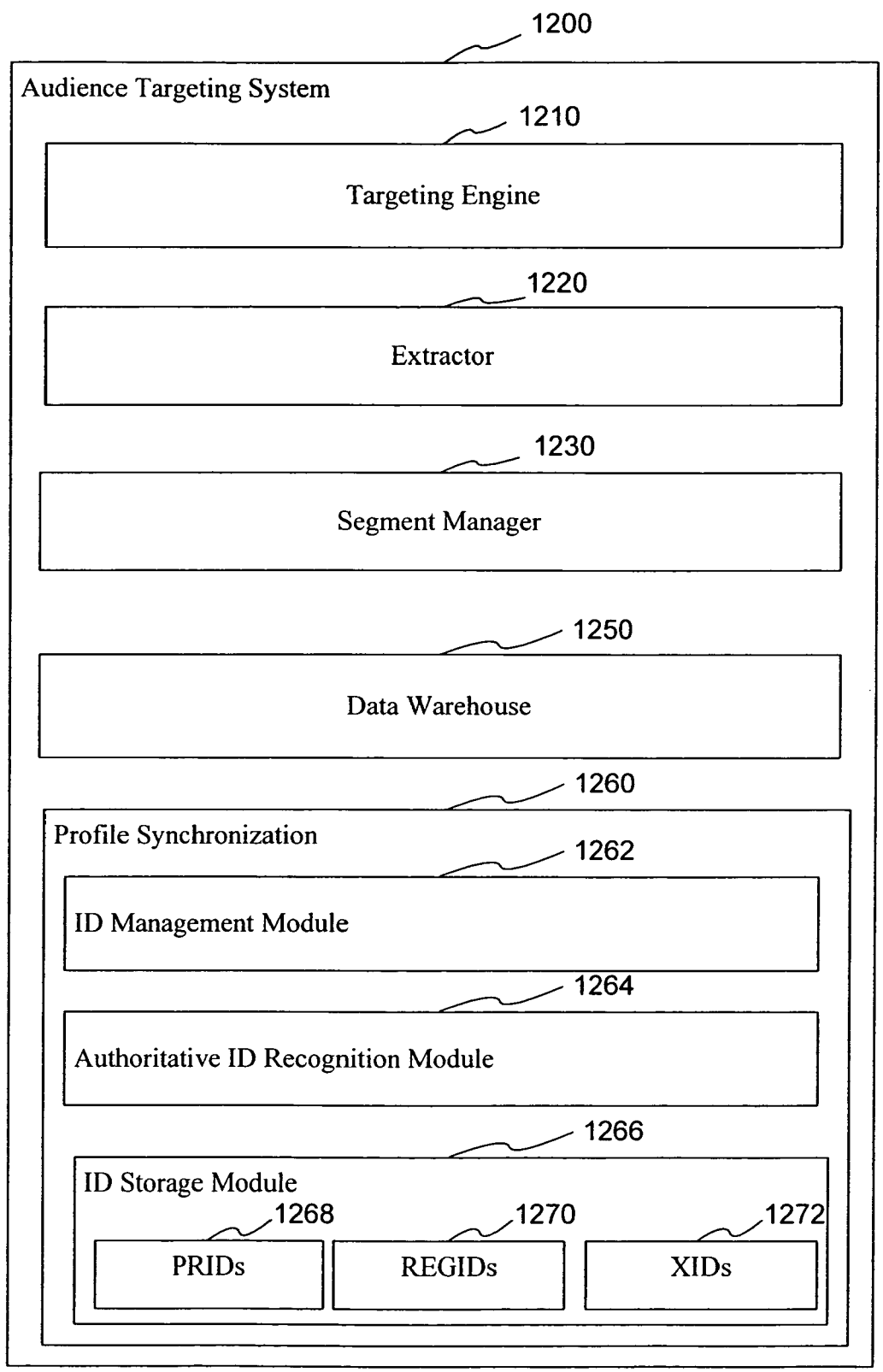
FIG. 12 is a block diagram illustrating an example of an audience targeting system that includes profile synchronization according to another aspect of the present invention.

FIG. 12 is a block diagram illustrating an example of an audience targeting system 1200 that includes profile synchronization 1260 according to another aspect of the present invention. Profile synchronization variously corrects and mitigates problems associated with these conditions. In one embodiment, the PRID is a system based identifier that uniquely identifies an audience member. An authoritative identifier (e.g., a registration identifier) is also sought and maintained in association with a profiled audience member. An authoritative identifier may be identified in connection with some collected profile data. Maintenance of associations between authoritative identifiers and PRIDs allows such collected profile data to be properly associated with a particular audience member despite the absence of a PRID in the collected data. This functionality also accommodates the potential generation of multiple cookie based identifiers by a particular audience member. In contrast to the system identifier (PRID), which may also be referred to as an internal identifier, these cookie based identifiers are examples of external identifiers (XIDs). Maintenance of associations between each profiled audience member's PRID with one or more XIDs allows management of multiple external (e.g., cookie based) identifiers in association with a particular audience member.

Before turning to a more detailed discussion of profile synchronization, it is noted that in embodiments of audience targeting that do not implement profile synchronization, the XID may essentially equate with the PRID for the purpose of audience member profile management. It is also noted that although cookie based XIDs are described, other external identifiers such as those that correlate to usage of a non-web device may also be implemented.

The Audience Targeting System 1200 includes a TE 1210, Extractor 1220, Segment Manager 1230 and Data Warehouse 1250. These elements are analogous to the commonly named elements in the previously described Audience Targeting System (800, FIG. 8) and need not be repeated with regard to the profile synchronization aspect.

As with the previously described system, the Audience Targeting System 1200 and its components are illustrated collectively, but may be provided individually and separately if desired. The functionality of the Profile Synchronization module 1260 is preferably provided by software that may be executed on any conventional processing system. In that regard, the audience targeting system 1200 (or any sub-module) may in turn be a component of a computer system containing a processor and memory. Although one modular breakdown is shown, it should be understood that the described functionality may be provided by greater, fewer and/or differently named components. Although a software embodiment is described, the functionality may also be provided as hardware or firmware, or any combination of software, hardware, and/or firmware.

The Profile Synchronization module 1260 includes an ID Management module 1262, an Authoritative ID Recognition module 1264, and an ID Storage module 1266 that in turn stores profile identifiers (PRIDs) 1268, REGIDs 1270, and XIDs 1272.

Profile synchronization entails a recognition that audience members, and the potential multiple identifiers that they may become associated with, may be associated with an authoritative identifier (ID). The Authoritative ID is in turn used to manage the multiple identifiers as well as the profile data associated with the audience member. In one embodiment, the Authoritative ID is associated to registration (e.g., login credentials, REGID) for the user web site. For example, the web site may be The New York Times web site, which might require registration and login for usage of certain elements of the site.

The Profile Synchronization module 1260 implements PRIDs to uniquely identify audience members even as they generate multiple XIDs. In that regard, PRIDs may be regarded as system level, or more particularly Audience Targeting System 1200 level unique identifiers, and XIDs as audience member machine level based unique identifiers.

To accommodate the profile synchronization functionality, the ID Storage module 1266 stores the various ID information, including PRIDs 1268, REGIDs 1270, and XIDs 1272. The ID Management module 1262 organizes the issuance of and relationships between the various ID information. It accommodates this by associating the PRID for a particular user as uniquely identifying them on the system. This information may be stored along with other characteristics information such as the first date that the audience member was recognized by the system. Tables and the like may also be used to associate the audience member's PRID to the XIDs that are correlated to that audience member using profile synchronization, as well as to the REGID to accommodate recognition of audience members in conjunction with the Authoritative ID Recognition module 1264, which determines the presence of authoritative identification and communicates with the ID management module 1262 to ensure proper issuance of corresponding unique IDs.

Figure 13:
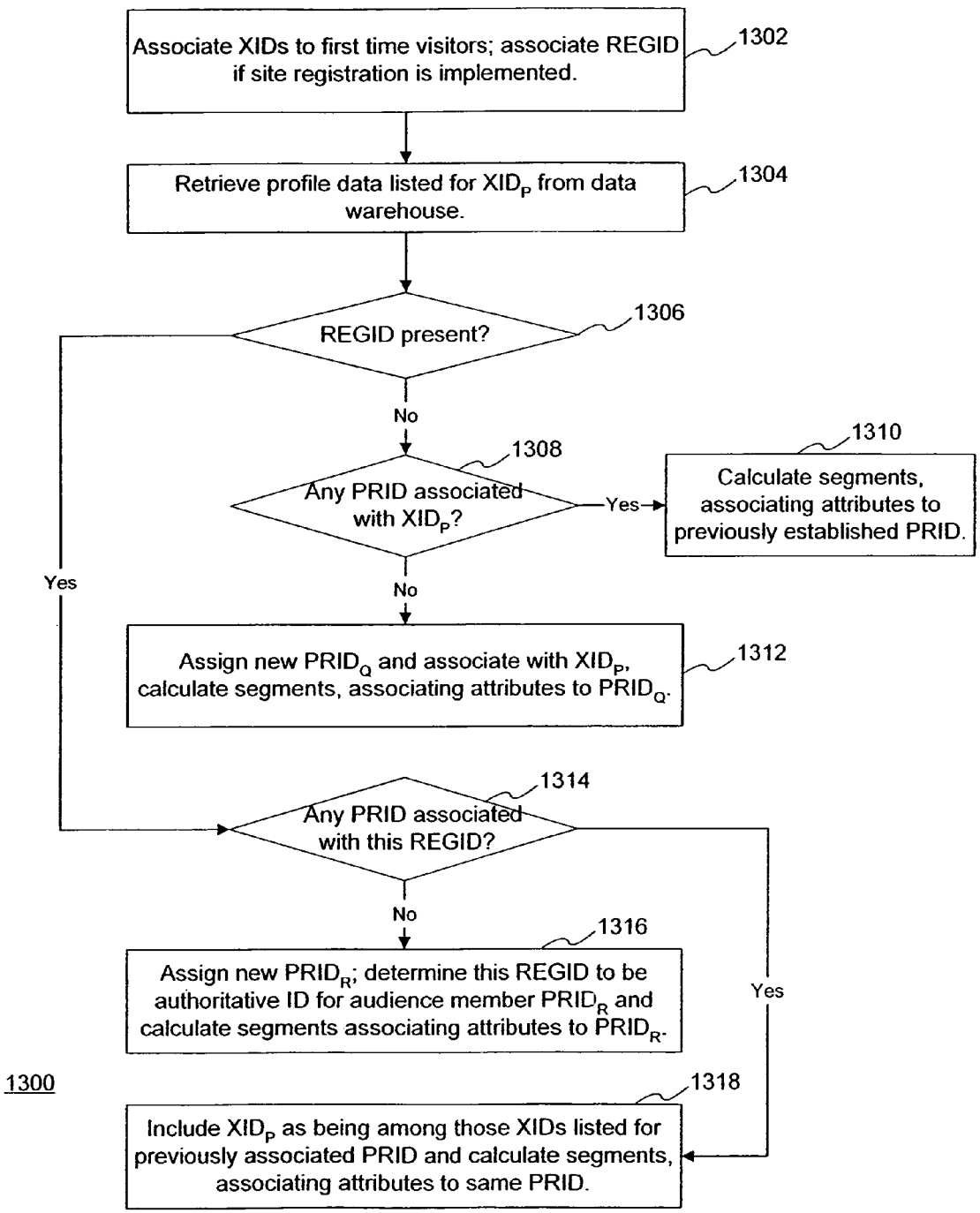
FIG. 13 is a flow diagram illustrating an example of a process for profile synchronization.

The functionality of the Profile Synchronization module 1260 is further described with reference to the flow diagram of FIG. 13, which illustrates an example of a process 1300 for profile synchronization.

In support of the profile synchronization functionality, a new unique XID is associated 1302 with a first time visitor to the web site. If registration is applicable for the session, then the REGID is associated as well. These functions are provided during regular browsing of pages and facilitated by the data agent as described above. Also in the described fashion, the data warehouse is populated with profile data corresponding to audience members. Unique REGIDs are thus also associated to respective sets of profile data along with the unique XIDs.

The profile data may be retrieved 1304 from the data warehouse in the previously described fahion. In embodiments using fact tables, this means that entries identifying both the XID and the REGID will be provided in association with the listed attributes. The fact table includes at least an XID, denoted particularly as $XID_P$ in this example. A first determination 1306 is made as to whether a REGID is also included in the fact table. As described, the REGID is used as the authoritative ID. In its absence, the system seeks to process the data by attempting to associate the fact table with a PRID. As described, a list of XIDs is maintained in association with each PRID. This information is examined to see whether the particular XID (denoted $XID_P$) is found. If found, it is mapped to at least one PRID. It may be possible that an XID is mapped to multiple PRIDs. In that case the system may choose a random PRID, the first one found, or use any algorithm to select one. It should be noted that fact tables may be variously organized to provide this functionality. In one example of this the different attributes (Section, Age, Gender, Referrer, etc.) may each have a different table where a particular value is associated to a particular profile via the PRID.

With profile synchronization, the PRID uniquely identifies audience members for the purpose of segmenting. Accordingly, when it is determined 1308 that a particular PRID is associated with the particular $XID_P$, segments are calculated 1310 associating the attributes in the fact table to that particular PRID. If a PRID is not determined 1318 to be associated with $XID_P$, then a new $PRID_Q$ is issued 1312. In conjunction with that, $XID_P$ is mapped to $PRID_Q$, and segments are calculated accordingly.

If it is determined 1306 that a REGID is present in the fact table, such is construed as the authoritative ID. This may be the first instance that the system sees a particular REGID, in which case a PRID is assigned (denoted $PRID_R$) and mapped to the REGID (1316).

If it is determined 1314 that there is already a PRID associated with the particular REGID (i.e., not the first instance of seeing REGID), then the particular PRID (the unique PRID number for that audience member) is associated to the fact table attributes and corresponding segments. Additionally, if such is not already the case, $XID_P$ is included 1318 in the list of XID numbers that the system has associated to the particular PRID.

If desired, the segment manager may also segregate segments for an audience member using the XID list. For example, a particular audience member may have two XIDs associated to their unique PRID. One XID may correspond to his home computer and another XID may correspond to his work computer. Although the system will (through connection to the authoritative ID as described above) conclude that he is the same person and that all of the activities from both computers could be commonly segmented under the unique PRID, the listing of XIDs in association with that PRID allows the system to generate separate segments if desired. This may in fact be desirable to certain users of the Audience Targeting System since in some instances an audience member may have separate home and office personas in terms of computer usage and desired ad exposure.

Thus embodiments of the present invention produce and provide segment management and profile synchronization in an audience targeting environment. Although the present invention has been described in considerable detail with reference to certain embodiments thereof, the invention may be variously embodied without departing from the spirit or scope of the invention. Therefore, the following claims should not be limited to the description of the embodiments contained herein in any way.

The invention claimed is:

1. A method of delivering content to a client computer based on client profile data, comprising the steps of:

receiving profile data associated with a first plurality of client computers, said profile data indicating attributes associated with the first plurality of client computers;

defining a hierarchical organization of audience segments based upon the profile data, the hierarchical organization of audience segments including a first audience segment, a second audience segment, and a third audience segment;

determining client computer membership in the first audience segment based on the association of client computers with a first set of attributes;

determining client computer membership in the second audience segment based on the association of client computers with a second set of attributes, wherein the first and second sets of attributes are different from each other;

determining client computer membership in the third audience segment based on the association of client computers with a combination of the first and second sets of attributes;

transmitting segment-targeting cookies having a segment identifier for the third audience segment to a second plurality of client computers based on the determination of client computer membership in the third audience segment;

selecting content to deliver to the second plurality of client computers; and delivering the selected content to the second plurality of client computers based on the determination of the segment identifier in the segment-targeting cookies.

2. The method of claim 1, further comprising:

receiving incremental profile data following the determination of membership in the third audience segment; and re-determining membership in the third audience segment based on a determination from the incremental profile data that additional client computers are associated with the first set of attributes.

3. The method of claim 2, wherein re-determining membership in the third audience segment includes a determination that at least one of the first plurality of client computers is no longer associated with the first set of attributes.

4. The method of claim 1, further comprising:

maintaining a first membership list identifying client computers associated with the first set of attributes;

maintaining a second membership list identifying client computers associated with the second set of attributes; and applying a Boolean operation to the first and second membership lists in determining membership in the third audience segment.

5. The method of claim 1, wherein the selected content is advertising, and the profile data includes a behavioral component.

6. The method of claim 5, wherein the computer network includes the Internet, and the behavioral component includes information about Internet browsing activities.

7. A computer implemented method for delivering content to a client computer over a computer network, the method comprising:

accommodating the receipt of input to define a hierarchical organization of audience segments based upon profile data that is attributable to client computers, the hierarchical organization of audience segments including a first audience segment, a second audience segment, and a third audience segment that depends from the first audience segment and the second audience segment;

calculating membership in the third audience segment by receiving profile data and determining that a first plurality of client computers are associated with a combination of attributes associated with the first audience segment and the second audience segment;

transmitting a segment-targeting cookie having a segment identifier for the third audience segment to the first plurality of client computers based on the calculation of membership in the third audience segment; and accommodating the delivery of content to the first plurality of client computers through the computer network based upon the segment identifier for the third audience segment in the segment-targeting cookie .

8. The method of claim 7, further comprising:

receiving incremental profile data following the calculation of membership in the third audience segment; and recalculating membership in the third audience segment based upon a determination from the incremental profile data that additional client computers have attributes associated with the first audience segment.

9. The method of claim 8, wherein recalculating membership in the third audience segment includes a determination that at least one of the first plurality of client computers no longer has the attributes associated with the first audience segment.

10. The method of claim 7, further comprising:

maintaining first and second membership lists respectively identifying client computers having attributes associated with the first and second audience segments; and applying a Boolean operation to the first and second membership lists in calculating membership in the third audience segment.

11. The method of claim 10, wherein maintaining the first and second membership lists comprises:

determining at least one attribute respectively associated with the first and second audience segments; and receiving the profile data and determining those client computers that have the at least one attribute associated with the first or second audience segments.

12. The method of claim 7, wherein the content is advertising, and the profile data includes characteristic and behavioral components.

13. The method of claim 12, wherein the computer network includes the Internet, and the behavioral component includes information about Internet browsing activities.

\* \* \* \* \*